(12) United States Patent
Mehrabi et al.

(10) Patent No.: US 12,342,141 B2
(45) Date of Patent: Jun. 24, 2025

(54) MAPPING AND CHARACTERIZING ACOUSTIC EVENTS WITHIN AN ENVIRONMENT VIA AUDIO PLAYBACK DEVICES

(71) Applicant: Sonos, Inc., Santa Barbara, CA (US)

(72) Inventors: Adib Mehrabi, London (GB); Saeed Bagheri Sereshki, Goleta, CA (US); Jerad Lewis, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 169 days.

(21) Appl. No.: 17/936,668

(22) Filed: Sep. 29, 2022

(65) Prior Publication Data
US 2023/0097522 A1   Mar. 30, 2023

Related U.S. Application Data

(60) Provisional application No. 63/261,890, filed on Sep. 30, 2021.

(51) Int. Cl.
*H04R 3/12* (2006.01)
*G06F 3/16* (2006.01)
(Continued)

(52) U.S. Cl.
CPC .............. *H04R 3/12* (2013.01); *G06F 3/165* (2013.01); *G10K 11/1752* (2020.05);
(Continued)

(58) Field of Classification Search
CPC .......... H04R 3/12; H04R 1/403; H04R 27/00; H04R 29/002; H04R 2227/005;
(Continued)

(56) References Cited

U.S. PATENT DOCUMENTS 5,440,644 A   8/1995   Farinelli et al.
5,761,320 A   6/1998   Farinelli et al.
(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
(Continued)

*Primary Examiner* — Andrew Sniezek
(74) *Attorney, Agent, or Firm* — Fortem IP LLP

(57) ABSTRACT

Systems and methods for mapping noise via a plurality of playback devices within an environment are disclosed herein. In one example, a plurality of playback devices can each output audio and also detect sound within the environment to obtain respective sound data specimens. For each playback device, the respective sound data specimen can be analyzed to obtain a respective noise determination. A spatial map of the noise determinations within the environment can then be constructed. A visual representation of the spatial map can further be presented to a user. In response to the noise determinations and/or a user input, the audio output via at least one of the playback devices can be modified, for example to mask or suppress noise within one or more regions of the environment.

20 Claims, 17 Drawing Sheets

(51) Int. Cl.
*G10K 11/175* (2006.01)
*G10L 25/51* (2013.01)
*G10L 25/84* (2013.01)
*H04R 1/40* (2006.01)
*H04R 27/00* (2006.01)
*H04R 29/00* (2006.01)

(52) U.S. Cl.
CPC .............. *G10L 25/51* (2013.01); *G10L 25/84* (2013.01); *H04R 1/403* (2013.01); *H04R 27/00* (2013.01); *H04R 29/002* (2013.01); *H04R 2227/005* (2013.01)

(58) Field of Classification Search
CPC ..... G10K 11/1752; G06F 3/165; G10L 25/51; G10L 25/81
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,949,054 | B2 * | 4/2018 | Kadri ....................... H04R 5/02 |
| 10,602,268 | B1 * | 3/2020 | Soto ........................ G10L 25/84 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2022/0283774 | A1 * | 9/2022 | Schultz .................. G06F 3/165 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc. v. D&M Holdings* (No. 14-1330-RGA), DI 219, Claim Construction Opinion (Jan. 12, 2017) (24 pages).
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

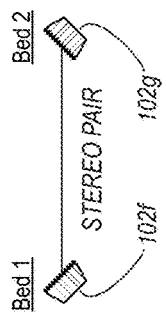
*Figure 3B*
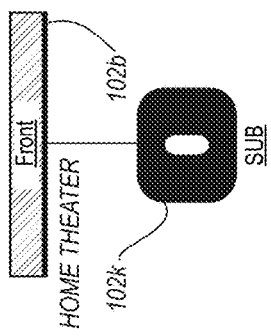
*Figure 3C*
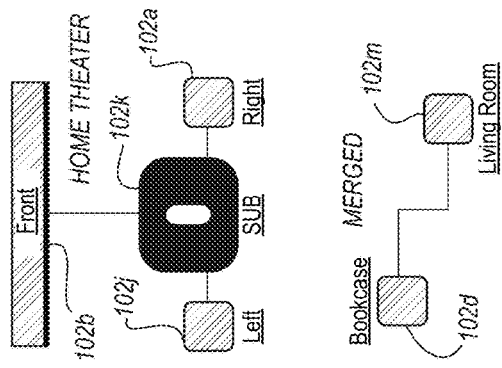
*Figure 3D*
*Figure 3E*
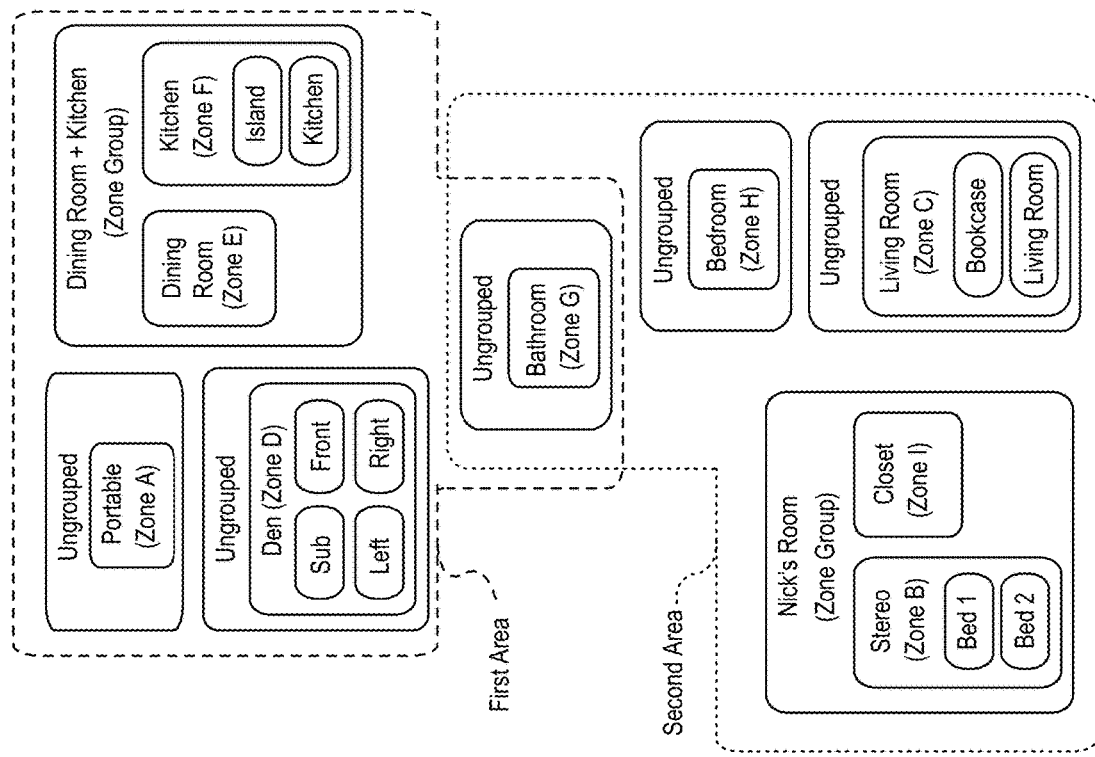
*Figure 3A*

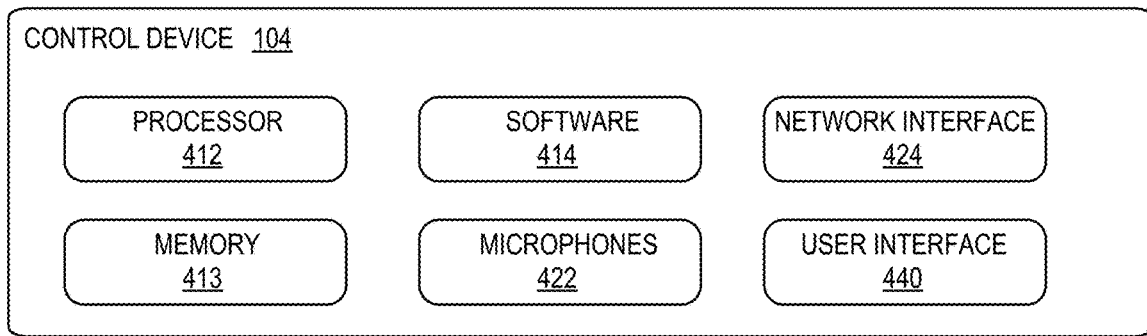
Figure 4A
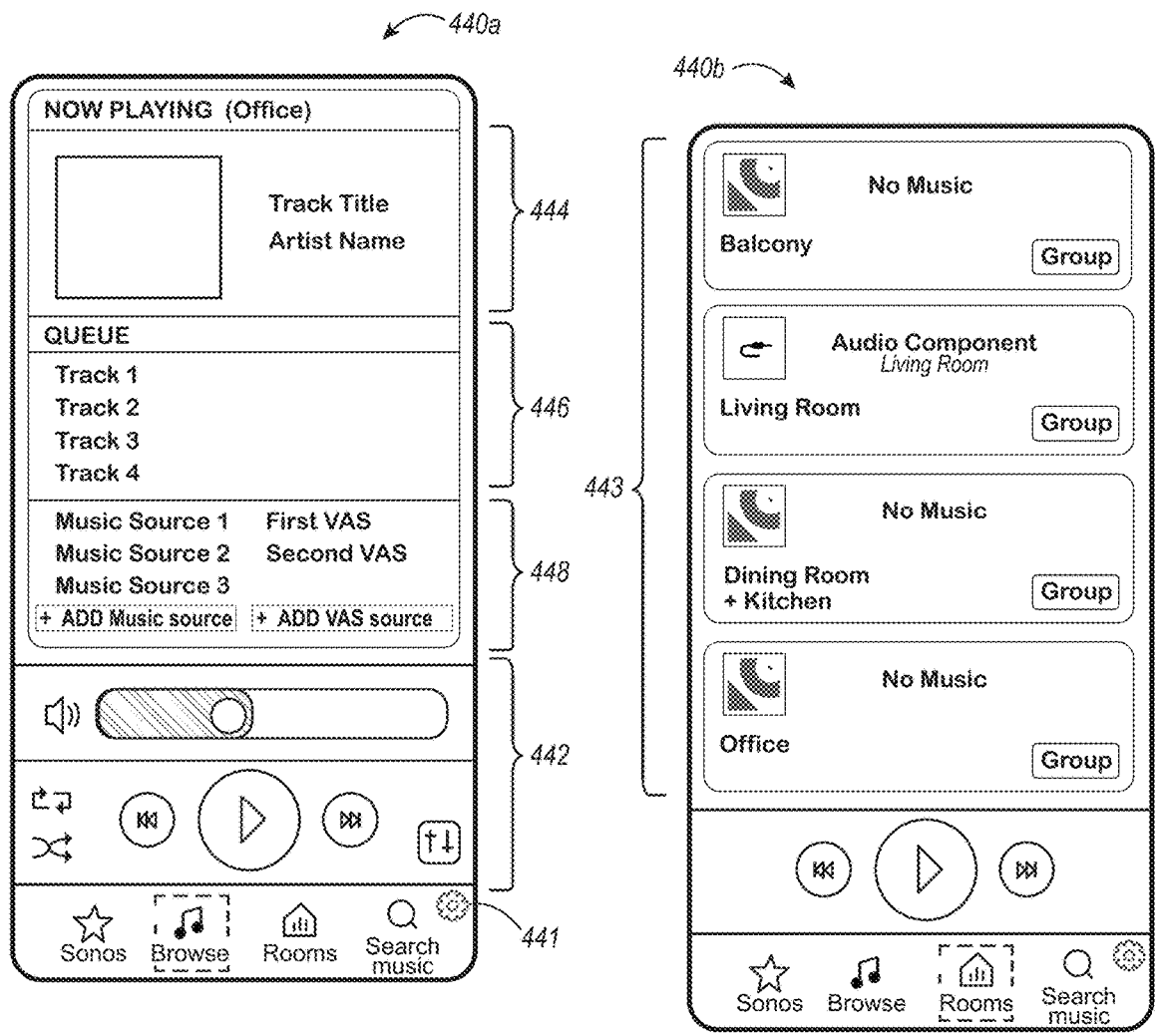
Figure 4B
Figure 4C ns of an example network microphone device in accordance with aspects of the disclosure.

MAPPING AND CHARACTERIZING ACOUSTIC EVENTS WITHIN AN ENVIRONMENT VIA AUDIO PLAYBACK DEVICES

CROSS-REFERENCE TO RELATED APPLICATION

This application claims priority to U.S. patent application Ser. No. 63/261,890, filed Sep. 30, 2021, filed Sep. 30, 2021, which is incorporated herein by reference in its entirety.

TECHNICAL FIELD

The present technology relates to consumer goods and, more particularly, to methods, systems, products, features, services, and other elements directed to voice-controllable media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings.

FIGS. 3A-3E are diagrams showing example playback device configurations in accordance with aspects of the disclosure.

FIG. 4A is a functional block diagram of an example controller device in accordance with aspects of the disclosure.

FIGS. 4B and 4C are controller interfaces in accordance with aspects of the disclosure.

Figure 1A:
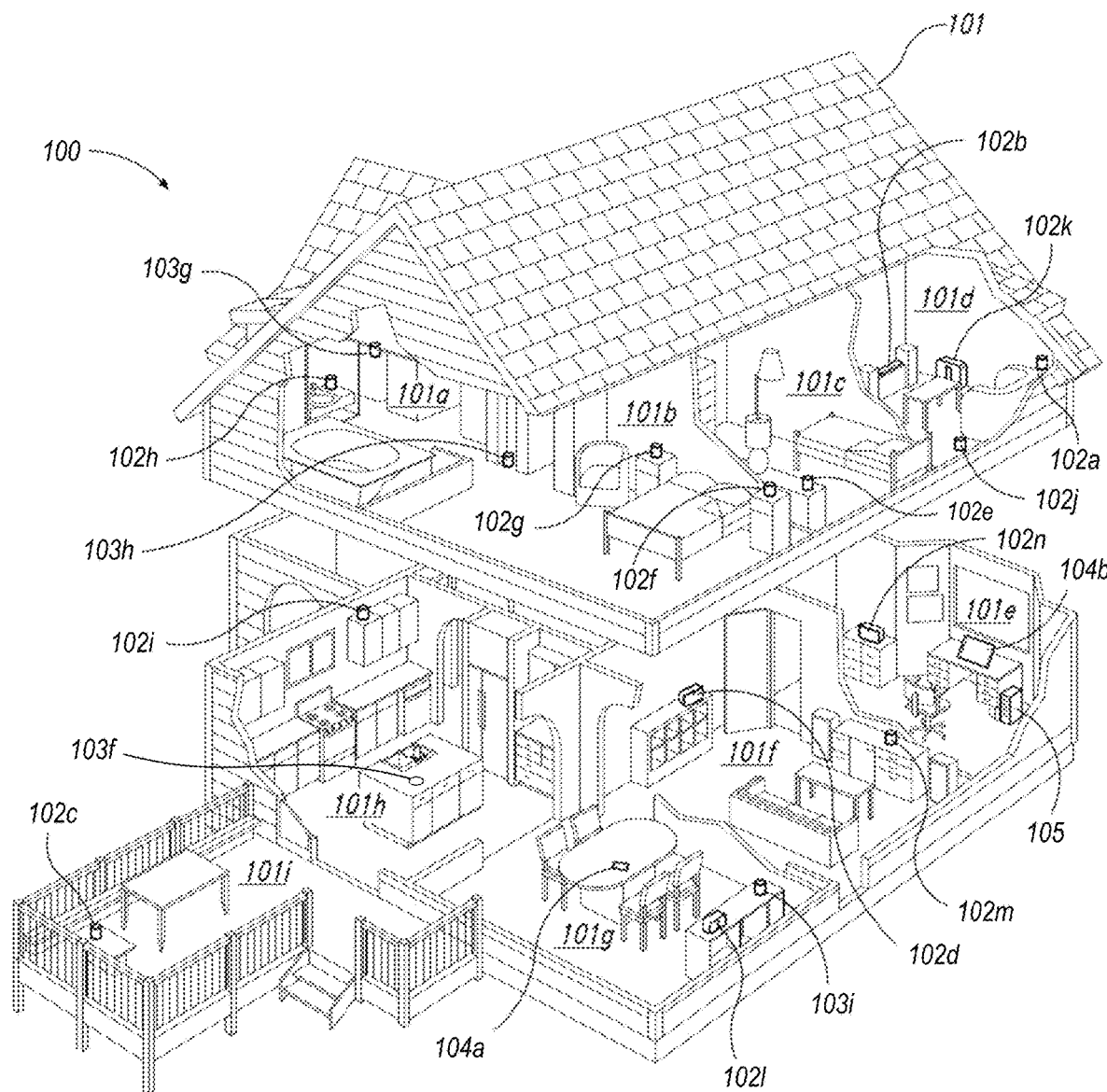
FIG. 1A is a partial cutaway view of an environment having a media playback system configured in accordance with aspects of the disclosed technology.

The drawings are for purposes of illustrating example aspects of the present technology, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

A network microphone device ("NMD") is a networked computing device that typically includes an arrangement of microphones, such as a microphone array, that is configured to detect sounds present in the NMD's environment. In some implementations, a playback device that is configured to be part of a networked media playback system may include components and functionality of an NMD (i.e., the playback device is "NMD-equipped"). In this respect, such a playback device may include a microphone that is configured to detect sounds present in the playback device's environment, such as people speaking, audio being output by the playback device itself or another playback device that is nearby, noise within the environment, or other acoustic events.

Certain NMD-equipped playback devices can be distributed within an environment, such as a user's home, or a commercial space such as a restaurant, retail store, mall, hotel, etc. Some NMD-equipped playback devices may include an internal power source (e.g., a rechargeable battery) that allows the playback device to operate without being physically connected to a wall electrical outlet or the like. In this regard, such a playback device may be referred to herein as a "portable playback device." On the other hand, playback devices that are configured to rely on power from a wall electrical outlet or the like may be referred to herein as "stationary playback devices," although such devices may in fact be moved around a home or other environment. In practice, a person might often take a portable playback device to and from a home or other environment in which one or more stationary playback devices remain. In some examples, a plurality of NMD-equipped playback devices are installed within a commercial environment, such as being mounted to walls and ceilings, integrated into light fixtures, or otherwise embedded at a plurality of locations within the environment.

In the case of voice input, sound detected via an NMD may include a person's speech mixed with background noise (e.g., music being output by a playback device or other ambient noise). In practice, an NMD typically filters detected sound to separate the background noise from the person's speech to facilitate identifying whether the speech contains a voice input indicative of voice control. If so, the NMD may take action based on such a voice input.

In the case of detecting or characterizing acoustic events within an environment, the NMD can be configured to continuously or intermittently detect sound from the environment. This detected sound may then be analyzed to characterize noise or other acoustic events within the environment. As described in greater detail below, a plurality of NMDs within an environment can each make respective noise determinations based on the sound as detected by the microphone(s) of each NMD. In some examples, these respective noise determinations can include determining relative noise levels. Additionally or alternatively, the noise determinations can include classification of the noise into discrete types (e.g., traffic noise, background speech, running water, fan noise, etc.). Moreover, in some examples each of the NMDs can detect various acoustic events, such as calculating a speech detection probability based on the detected sound, detecting a door opening or closing, a person walking across a room, or any other suitable acoustic event.

By comparing and combining the determinations of each of the respective NMDs, a spatial map of the noise (or speech or other acoustic events) within the environment can be constructed. The spatial map can be presented visually to a user via an interface (e.g., a controller device such as a smartphone, tablet, etc.). This may be useful, for example, when a maitre d' is deciding where to seat certain guests in a restaurant (e.g., selecting a table within a region having lower detected noise levels). As another example, the spatial map may inform a user of the need for acoustic panels or other interventions to suppress noise within an environment (e.g., dishwasher noise being audible at tables nearest to the kitchen).

In some examples, the NMDs can modify an audio output based on the acoustic determinations (e.g., detection of noise, speech, etc.) within the environment. For instance, consider a restaurant with a plurality of NMD-equipped playback devices distributed within the environment, such as mounted overhead in the ceiling. Each playback device may output audio such as background music. Each NMD may also detect sound within the environment and analyze the sound to classify noise or other acoustic events. If an NMD positioned in one region of the environment detects high noise levels, that NMD may modify its audio output in a manner that masks or suppresses the noise detected by that NMD. Additionally or alternatively, such modification of the audio output can be responsive to user input (e.g., via a controller device). Such modification can include, for example, adjusting a volume level, adjusting an equalization parameter, switching audio content, or layering on additional audio content (e.g., adding white noise configured to mask the particular noise detected).

Detection and characterization of noise and other acoustic events within an environment can be used for a variety of other purposes. In particular, constructing a spatial map of such noise and other acoustic events may be useful in a wide range of circumstances, including tailoring audio output to achieve a desired psychoacoustic effect, for detecting user presence or location within an environment, for estimating the number of people present within various regions of the environment, and numerous other instances.

While some examples described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
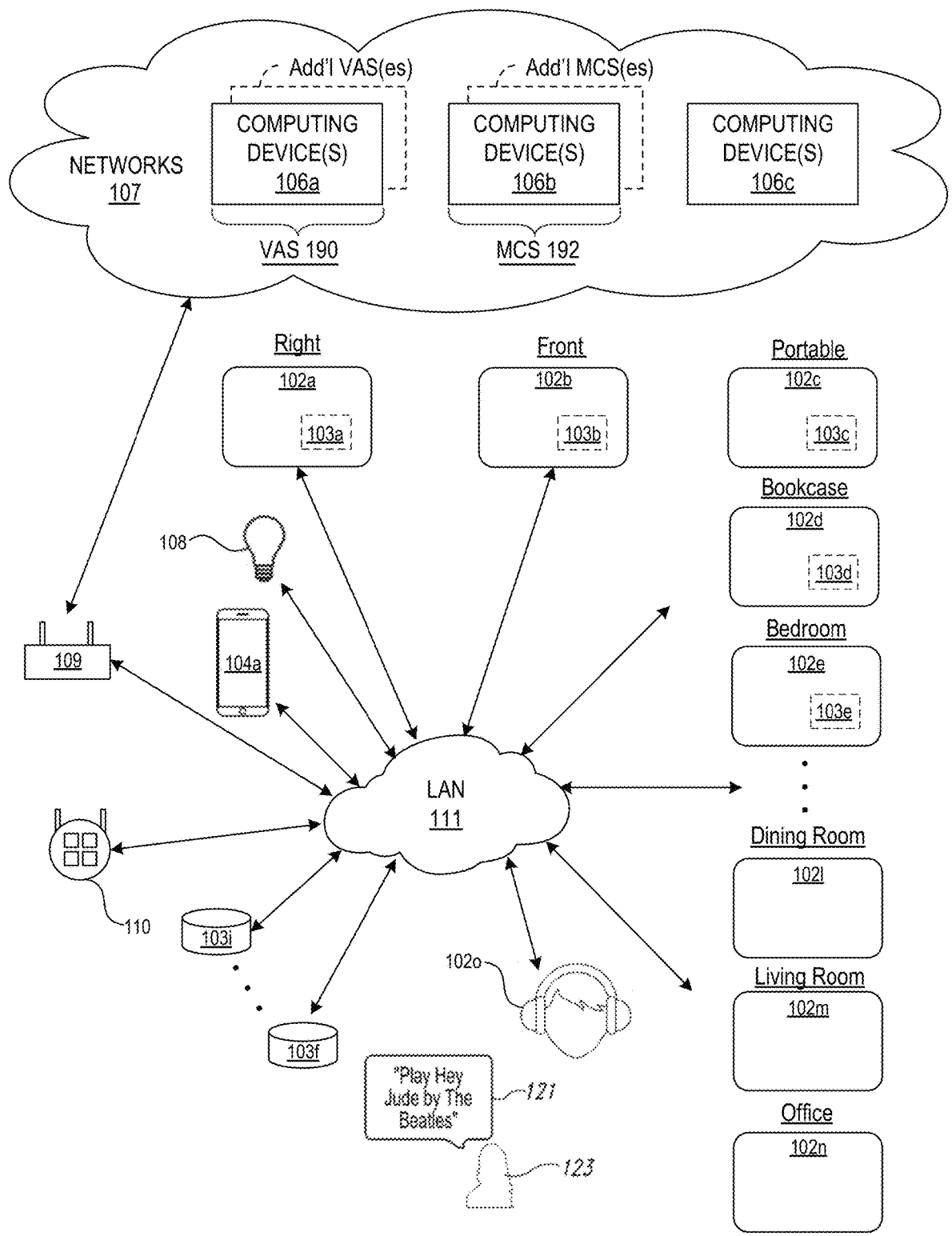
FIG. 1B is a schematic diagram of the media playback system of FIG. 1A and one or more networks.

FIGS. 1A and 1B illustrate an example configuration of a media playback system 100 (or "MPS 100") in which one or more examples disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b (referred to herein as "Nick's Room"), a second bedroom 101c, a family room or den 101d, an office 101e, a living room 101f, a dining room 101g, a kitchen 101h, and an outdoor patio 101i. While certain aspects and examples are described below in the context of a home environment, the technologies described herein may be implemented in other types of environments. In some examples, for instance, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In examples described below, one or more of the various playback devices 102 may be configured as portable playback devices, while others may be configured as stationary playback devices. For example, the headphones 102o (FIG. 1B) are a portable playback device, while the playback device 102*d* on the bookcase may be a stationary device. As another example, the playback device 102*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a LAN 111 including a network router 109. For example, the playback device 102*j* in the Den 101*d* (FIG. 1A), which may be designated as the "Left" device, may have a point-to-point connection with the playback device 102*a*, which is also in the Den 101*d* and may be designated as the "Right" device. In a related example, the Left playback device 102*j* may communicate with other network devices, such as the playback device 102*b*, which may be designated as the "Front" device, via a point-to-point connection and/or other connections via the LAN 111.

As further shown in FIG. 1B, the MPS 100 may be coupled to one or more remote computing devices 106 via a wide area network ("WAN") 107. In some examples, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106*a* are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 102 may take the form of or include an on-board (e.g., integrated) network microphone device. For example, the playback devices 102*a-e* include or are otherwise equipped with corresponding NMDs 103*a-e*, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103*f* and 103*g* may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102*d* because it is physically situated on a bookcase. Similarly, the NMD 103*f* may be assigned the named "Island" because it is physically situated on an island countertop in the Kitchen 101*h* (FIG. 1A). Some playback devices may be assigned names according to a zone or room, such as the playback devices 102*e*, 102*l*, 102*m*, and 102*n*, which are named "Bedroom," "Dining Room," "Living Room," and "Office," respectively. Further, certain playback devices may have functionally descriptive names. For example, the playback devices 102*a* and 102*b* are assigned the names "Right" and "Front," respectively, because these two devices are configured to provide specific audio channels during media playback in the zone of the Den 101*d* (FIG. 1A). The playback device 102*c* in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the LAN 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some examples, the remote computing device(s) and the media playback system 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103f in the Kitchen 101h (FIG. 1A) may be assigned to the Dining Room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the LAN 111 (FIG. 1B) may be eliminated and the single playback device 102 and/or the single NMD 103 may communicate directly with the remote computing devices 106a-d. In some examples, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
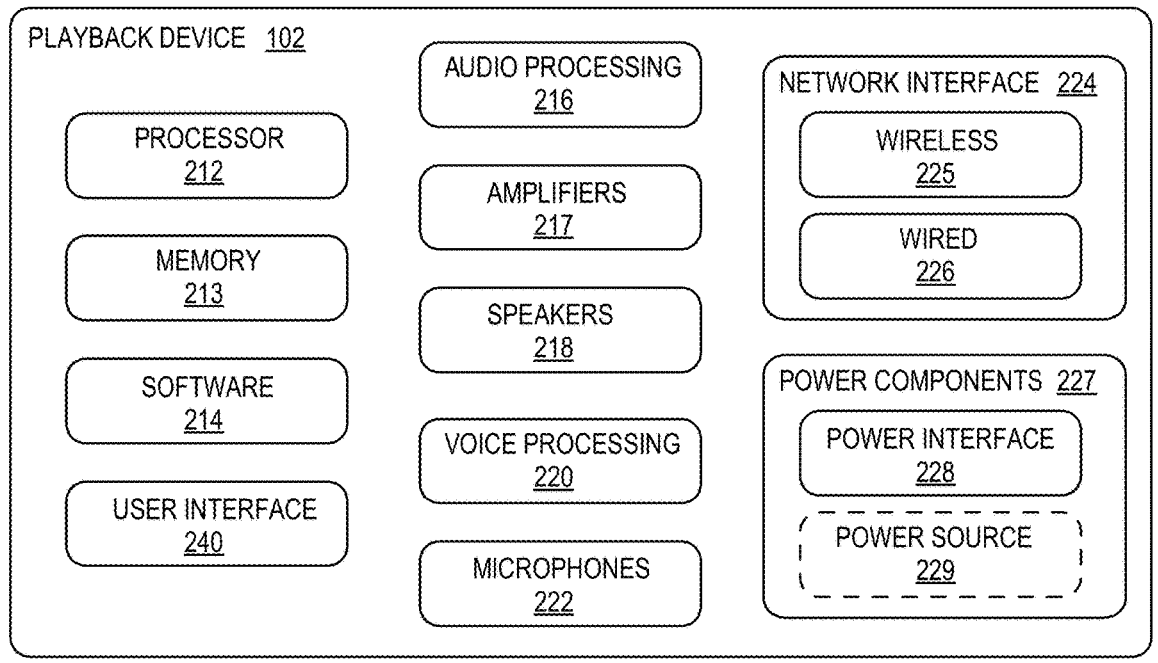
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain examples, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously-referenced U.S. patent application Ser. No. 15/438,749.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various examples, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
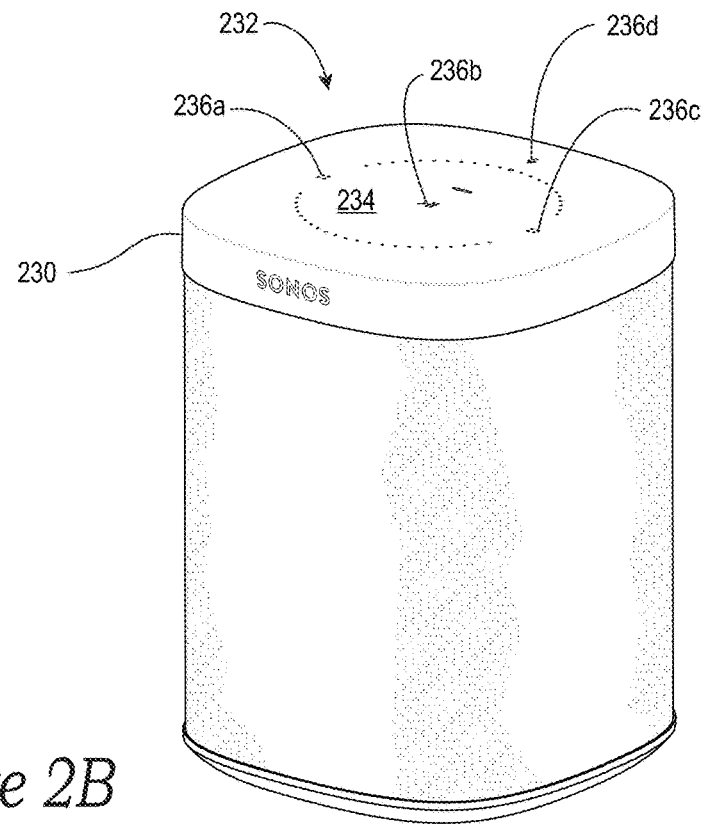
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the examples disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example aspects disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the media playback system 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various examples, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some examples, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101h (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one example, the playback devices 102d and 102m may playback audio in synchrony, during which each outputs the full range of audio content that each respective playback device 102d and 102m is capable of rendering.

In some examples, a stand-alone NMD may be in a zone by itself. For example, the NMD 103h from FIG. IA is named "Closet" and forms Zone I in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. patent application Ser. No. 15/438,749. In some examples, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some examples, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some examples, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some examples, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In examples described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone. For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4A is a functional block diagram illustrating certain aspects of a selected one of the controller devices 104 of the MPS 100 of FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™)

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4A, the controller device 104 also includes a user interface 440 that is generally configured to facilitate user access and control of the MPS 100. The user interface 440 may include a touch-screen display or other physical interface configured to provide various graphical controller interfaces, such as the controller interfaces 440a and 440b shown in FIGS. 4B and 4C. Referring to FIGS. 4B and 4C together, the controller interfaces 440a and 440b includes a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some examples, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some examples, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative example, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some examples, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some examples, audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some examples, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

e. Example Network Microphone Devices

Figure 5:
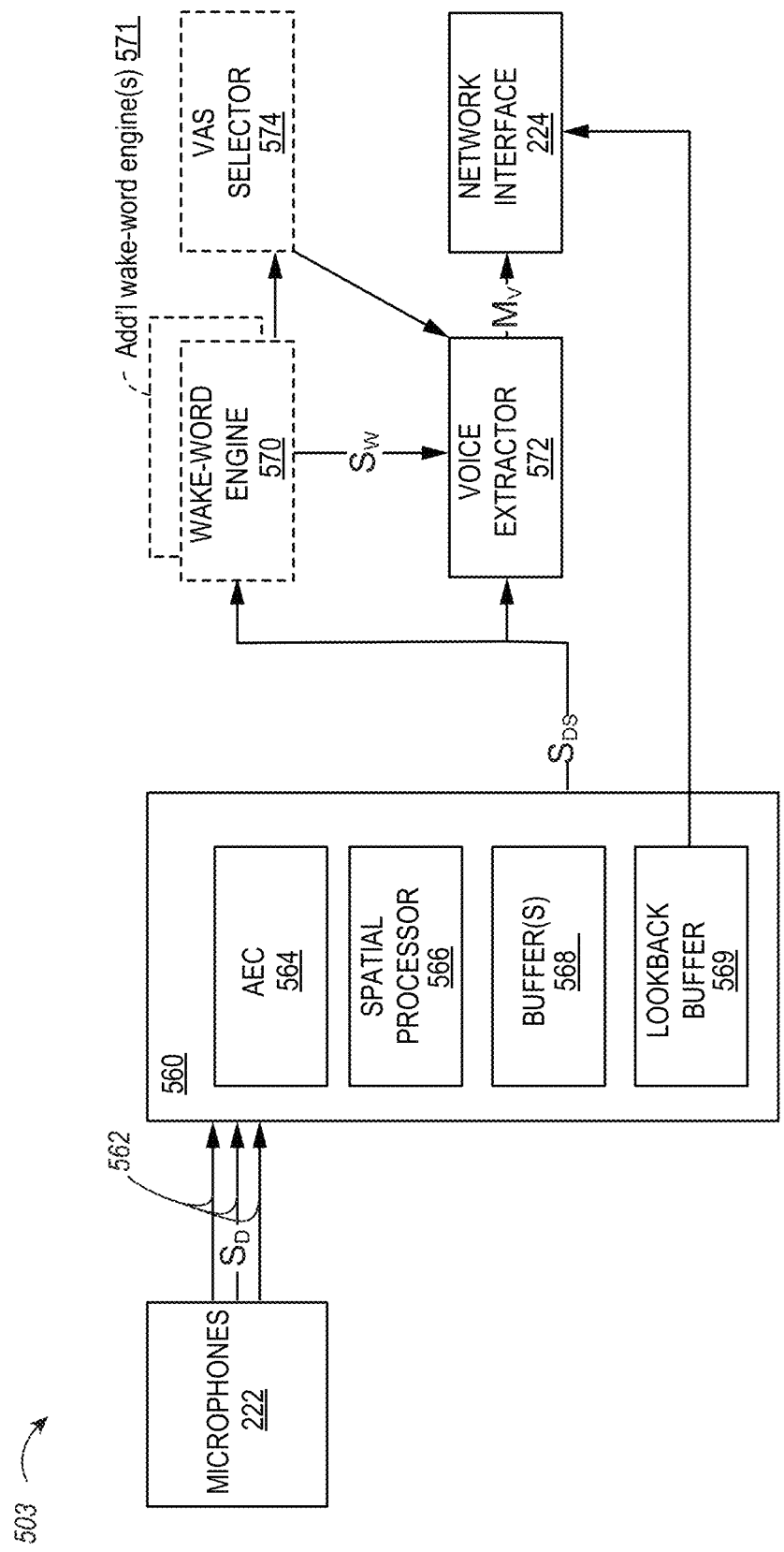
FIG. 5 is a functional block diagram of certain components of an example network microphone device in accordance with aspects of the disclosure.

FIG. 5 is a functional block diagram showing an NMD 503 configured in accordance with aspects of the disclosure. The NMD 503 includes voice capture components ("VCC", or collectively "voice processor 560"), and optionally also includes a wake-word engine 570, and at least one voice extractor 572, each of which is operably coupled to the voice processor 560. The NMD 503 further includes the microphones 222 and the at least one network interface 224 described above and may also include other components, such as audio amplifiers, interface, etc., which are not shown in FIG. 5 for purposes of clarity.

The microphones 222 of the NMD 503 are configured to provide detected sound, $S_D$, from the environment of the NMD 503 to the voice processor 560. The detected sound $S_D$ may take the form of one or more analog or digital signals. In example implementations, the detected sound $S_D$ may be composed of a plurality signals associated with respective channels 562 that are fed to the voice processor 560.

Each channel 562 may correspond to a particular microphone 222. For example, an NMD having six microphones may have six corresponding channels. Each channel of the detected sound $S_D$ may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

As further shown in FIG. 5, the voice processor 560 includes an AEC 564, a spatial processor 566, and one or more buffers 568. In operation, the AEC 564 receives the detected sound $S_D$ and filters or otherwise processes the sound to suppress echoes and/or to otherwise improve the quality of the detected sound $S_D$. That processed sound may then be passed to the spatial processor 566.

The spatial processor 566 is typically configured to analyze the detected sound $S_D$ and identify certain characteristics, such as a sound's amplitude (e.g., decibel level), frequency spectrum, directionality, etc. In one respect, the spatial processor 566 may help filter or suppress ambient noise in the detected sound $S_D$ from potential user speech based on similarities and differences in the constituent channels 562 of the detected sound $S_D$, as discussed above. As one possibility, the spatial processor 566 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 566 may be configured to determine a speech presence probability, examples of such functionality are disclosed in U.S. patent application Ser. No. 15/984,073, filed May 18, 2018, titled "Linear Filtering for Noise-Suppressed Speech Detection," and U.S. patent application Ser. No. 16/147,710, filed Sep. 29, 2018, and titled "Linear Filtering for Noise-Suppressed Speech Detection via Multiple Network Microphone Devices," each of which is incorporated herein by reference in its entirety.

If the NMD 503 includes a wake-word engine 570, the wake-word engine 570 can be configured to monitor and analyze received audio to determine if any wake words are present in the audio. The wake-word engine 570 may analyze the received audio using a wake word detection algorithm. If the wake-word engine 570 detects a wake word, a network microphone device may process voice input contained in the received audio. In some examples, the wake-word engine 570 runs multiple wake word detection algorithms on the received audio simultaneously (or substantially simultaneously). As noted above, different voice services (e.g. AMAZON's Alexa®, APPLE's Siri®, MICROSOFT's Cortana®, GOOGLE'S Assistant, etc.) each use a different wake word for invoking their respective voice service. To support multiple services, the wake-word engine 570 may run the received audio through the wake word detection algorithm for each supported voice service in parallel. In such examples, the network microphone device 103 may include VAS selector components 574 configured to pass voice input to the appropriate voice assistant service.

In operation, the one or more buffers 568—one or more of which may be part of or separate from the memory 213 (FIG. 2A)—capture data corresponding to the detected sound $S_D$. More specifically, the one or more buffers 568 capture detected-sound data that was processed by the upstream AEC 564 and spatial processor 566.

In general, the detected-sound data form a digital representation (i.e., sound-data stream), $S_{DS}$, of the sound detected by the microphones 222. In practice, the sound-data stream $S_{DS}$ may take a variety of forms. As one possibility, the sound-data stream $S_{DS}$ may be composed of frames, each of which may include one or more sound samples. The frames may be streamed (i.e., read out) from the one or more buffers 568 for further processing by downstream components, such as the wake-word engine 570 and the voice extractor 572 of the NMD 503.

In some implementations, at least one buffer 568 captures detected-sound data utilizing a sliding window approach in which a given amount (i.e., a given window) of the most recently captured detected-sound data is retained in the at least one buffer 568 while older detected-sound data are overwritten when they fall outside of the window. For example, at least one buffer 568 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, signal-to-noise ratio, microphone channel identification, and/or other information of the given sound specimen, among other examples. Thus, in some examples, a frame may include a portion of sound (e.g., one or more samples of a given sound specimen) and metadata regarding the portion of sound. In other examples, a frame may only include a portion of sound (e.g., one or more samples of a given sound specimen) or metadata regarding a portion of sound.

The voice processor 560 also includes at least one lookback buffer 569, which may be part of or separate from the memory 213 (FIG. 2A). In operation, the lookback buffer 569 can store sound metadata that is processed based on the detected-sound data $S_D$ received from the microphones 222. As noted above, the microphones 222 can include a plurality of microphones arranged in an array. The sound metadata can include, for example: (1) frequency response data for individual microphones of the array, (2) an echo return loss enhancement measure (i.e., a measure of the effectiveness of the acoustic echo canceller (AEC) for each microphone), (3) a voice direction measure; (4) arbitration statistics (e.g., signal and noise estimates for the spatial processing streams associated with different microphones); and/or (5) speech spectral data (i.e., frequency response evaluated on processed audio output after acoustic echo cancellation and spatial processing have been performed). Other sound metadata may also be used to identify and/or classify noise in the detected-sound data $S_D$. In at least some examples, the sound metadata may be transmitted separately from the sound-data stream $S_{DS}$, as reflected in the arrow extending from the lookback buffer 569 to the network interface 224. For example, the sound metadata may be transmitted from the lookback buffer 569 to one or more remote computing devices separate from the VAS which receives the sound-data stream $S_{DS}$. In some examples, for instance, the metadata can be transmitted to a remote service provider for analysis to construct or modify a noise classifier, as described in more detail below.

As described in more detail below with respect to FIGS. 6-17, in some examples, a remote computing device 106c or the local NMD 503 can perform additional calculations on the sound metadata to identify and/or classify noise which may be affecting (e.g., deleteriously affecting) downstream processing of the sound-data stream $S_{DS}$.

In any case, components of the NMD 503 downstream of the voice processor 560 may process the sound-data stream $S_{DS}$. For instance, the wake-word engine 570 can be configured to apply one or more identification algorithms to the sound-data stream $S_{DS}$ (e.g., streamed sound frames) to spot potential wake words in the detected-sound $S_D$. When the wake-word engine 570 spots a potential wake word, the wake-word engine 570 can provide an indication of a "wake-word event" (also referred to as a "wake-word trigger") to the voice extractor 572 in the form of signal Sw.

In response to the wake-word event (e.g., in response to a signal $S_W$ from the wake-word engine 570 indicating the wake-word event), the voice extractor 572 is configured to receive and format (e.g., packetize) the sound-data stream $S_{DS}$. For instance, the voice extractor 572 packetizes the frames of the sound-data stream $S_{DS}$ into messages. The voice extractor 572 transmits or streams these messages, $M_V$, that may contain voice input in real time or near real time to a remote VAS, such as the VAS 190 (FIG. 1B), via the network interface 224.

With continued reference to FIG. 5, in multi-VAS implementations, the NMD 503 may include a VAS selector 574 (shown in dashed lines) that is generally configured to direct the voice extractor's extraction and transmission of the sound-data stream $S_{DS}$ to the appropriate VAS when a given wake-word is identified by a particular wake-word engine, such as the first wake-word engine 570a, the second wake-word engine 570b, or the additional wake-word engine 571.

In such implementations, the NMD 503 may include multiple, different wake-word engines and/or voice extractors, each supported by a particular VAS.

III. Modifying NMD Operation Based on Noise Classification

Figure 6:
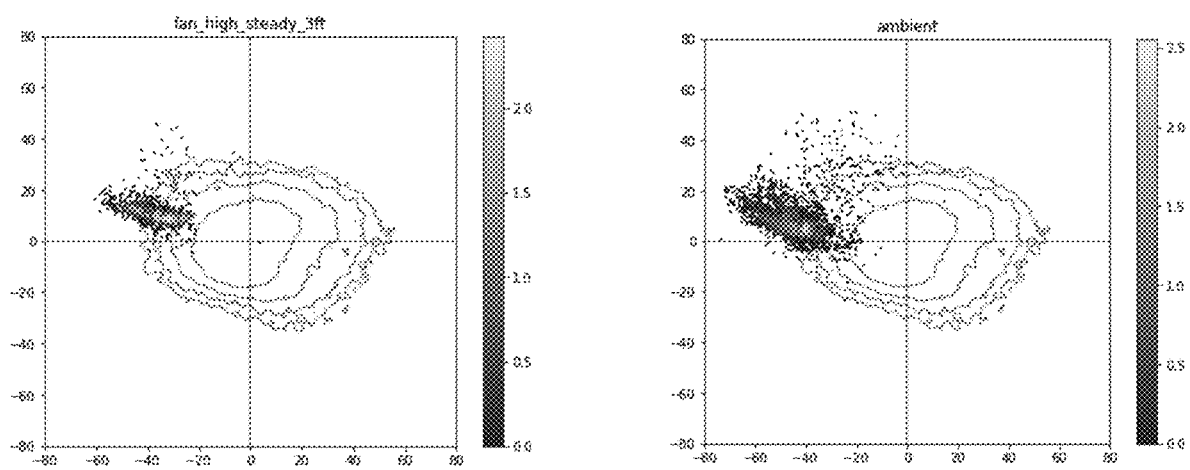
FIGS. 6 and 7 illustrate examples of the separation of the specific noises in the coordinate space defined by principal component analysis.
Figure 7:
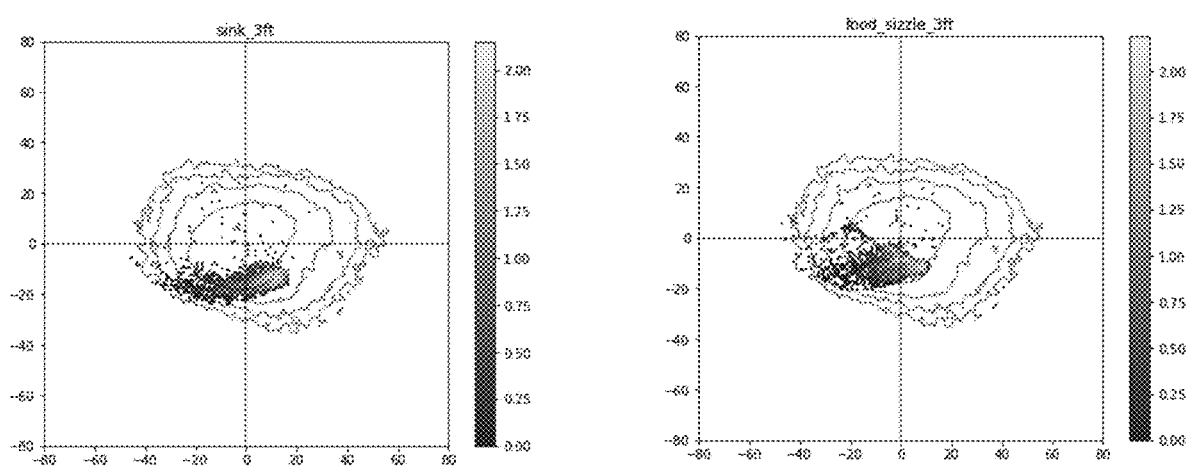

In operation, NMDs can be exposed to a variety of different types of noise, such as traffic, appliances (e.g., fans, sinks, refrigerators, etc.), construction, interfering speech, etc. To better analyze captured audio input in the presence of such noise, it can be useful to classify noises in the audio input. Different noise sources will produce different sounds, and those different sounds will have different associated sound metadata (e.g., frequency response, signal levels, etc.). The sound metadata associated with different noise sources can have a signature that differentiates one noise source from another. Accordingly, by identifying the different signatures, different noise sources can be classified by analyzing the sound metadata. FIGS. 6 and 7 illustrate analyzed sound metadata associated with four noise sources. In FIG. 6, the left plot is the noise of a fan on a high setting positioned three feet from the NMD and the right plot is ambient noise. In FIG. 7 the left plot is a running sink positioned three feet from the NMD; and the right plot is the sizzle of cooking food three feet from the NMD. In some implementations, these signatures shown in the plots may be generated using principal component analysis. As described in more detail below with respect to FIGS. 10-13, collected data from a variety of NMDs provides an overall distribution of possible frequency response spectra. In general, principal component analysis (PCA) can be used to find the orthogonal basis that describes the variance in all the field data. This eigenspace is reflected in the contours shown in the plots of FIGS. 6 and 7. Each dot in the plot represents a known noise value (e.g., a single frequency response spectrum from an NMD exposed to the noted noise source) that is projected onto the eigenspace. As seen in FIGS. 6 and 7, these known noise values cluster together when projected onto the eigenspace, generating notably distinct signature distributions for the different sources of noise. As described in more detail below, this classification of noise can be used to improve NMD performance.

As noted above, a network microphone device such as an NMD 503 can have a variety of tunable parameters that affect identification and processing of voice input in detected sounds captured by one or more microphones of the NMD. In response to classifying noise in the detected sound, one or more of these parameters can be modified to improve device performance. For example, in response to classifying noise in the detected sounds, the gain applied to the sound data during processing can be adjusted up or down to improve voice detection. In one example, an NMD may detect that a dishwasher is running based on classifying noise in the detected sound data. In response, the NMD may increase the gain or otherwise raise the volume level of audio played back via the NMD. When the NMD detects that the dishwasher is no longer running (e.g., by no longer identifying the classified noise in the detected sound data), the gain levels can be reduced such that playback resumes the previous volume level.

Another tunable parameter is noise-reduction, for example modifying the extent to which the NMD processes the sound data or sound-data stream to reduce noise and/or improve the signal-to-noise ratio. The NMD may also modify an acoustic echo cancellation (AEC) parameter (e.g., by modifying operation of the AEC 564 in FIG. 5) or other parameters of the voice processor 560 or other NMD components. As yet another example, a spatial processing algorithm of the NMD may be modified. For example, the voice processing path may reduce the number of microphone channels for a less noisy environment. In particular, if the NMD determines that low levels of noise are present in the detected sound data, one or more microphones of the NMD may be turned off, powered-down, or otherwise discarded such that downstream processing does not rely on input from those microphones. In one aspect, reducing the number of microphone channels may reduce the demand for and conserve computational resources. In a related aspect, conserving computational resources can free up these resources for use with other resources, such as for supporting additional wake-word engines that may be onboard or otherwise coupled to the NMD. If the NMD then detects an increase in noise levels (e.g., if the NMD identifies certain noise in the detected sound data), then some or all of the de-activated microphones may be re-activated. Additional details regarding selective de-activation of one or more microphones of an NMD can be found in U.S. application Ser. No. 16/147,710, which is hereby incorporated by reference in its entirety.

Another tunable parameter is a wake-word-detection sensitivity parameter. For example, the wake-word engine 570 (or any of the additional wake-word engines 571) may have one or more parameters that adjust a sensitivity or threshold for identifying a wake word in the audio input. This parameter can be adjusted to improve NMD performance in the presence of classified noise. Lowering the threshold (or increasing the sensitivity) may increase the rate of false-positives while reducing the rate of false-negatives, while conversely increasing the threshold (or decreasing the sensitivity) may decrease the rate of false-positives while increasing the rate of false-negatives. Adjusting the wake-word-detection sensitivity parameter can allow an NMD to achieve a suitable tradeoff between the false-negative and false-positive rates, which may vary depending on the particular noise conditions experienced by the NMD.

In addition or alternatively to those parameters listed above, in some examples the NMD can modify the spatial processing algorithm to improve performance in detecting and processing voice input in the presence of a particular class of noise (e.g., by modifying operation of the spatial processor 566 in FIG. 5). In various examples, the spatial processing algorithm can comprise one or more multi-channel Wiener filters, other filters, and/or one or more beam-forming algorithms, details of which may be found, for example, in previously reference application Ser. Nos. 15/984,073 and 16/147,710. As one possibility, the spatial processor 566 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 566 may be configured to determine a speech presence probability. The threshold or coefficients associated with these metrics (e.g., energy within certain bands, entropy, etc.) can be adjusted to improve performance of the NMD in detecting and processing voice input in the presence of a particular class of noise. For example, the hum of a refrigerator may be identified as noise and classified by the NMD. In response to this classification, one or more parameters of a multi-channel Wiener filter spatial processing algorithm can be adjusted to improve NMD performance in the presence of this noise. Such parameters can include the minimum gain, reflecting a spectral floor of the noise reduction portion of the multi-channel Wiener filter. Other parameters of the multi-channel Wiener filter can be modified to improve NMD performance.

In various examples, the NMD performance parameters can be adjusted on an individual device level, on a home or environment level (e.g., all the NMDs within a customer's home can be adjusted together), or on a population level (e.g., all the NMDs in a given region can be adjusted together). As described in more detail below, one or more NMD performance parameters can be modified based on noise classification, which can be derived using sound metadata. Sound metadata can be derived from the sound data $S_D$ obtained via the individual microphones of the NMD and/or from the sound-data stream $S_{DS}$ provided by the voice processor 560 (FIG. 5). Example of sound metadata include: (1) frequency response data, (2) an echo return loss enhancement measure (i.e., a measure of the effectiveness of the acoustic echo canceller (AEC)), (3) a voice direction measure; (4) arbitration statistics (e.g., signal and noise estimates for the spatial processing streams associated with different microphones); and/or (5) speech spectral data (i.e., frequency response evaluated on processed audio output after acoustic echo cancellation and spatial processing have been performed). Other sound metadata may also be used to classify noise in sound detected via the NMD.

Figure 8A:
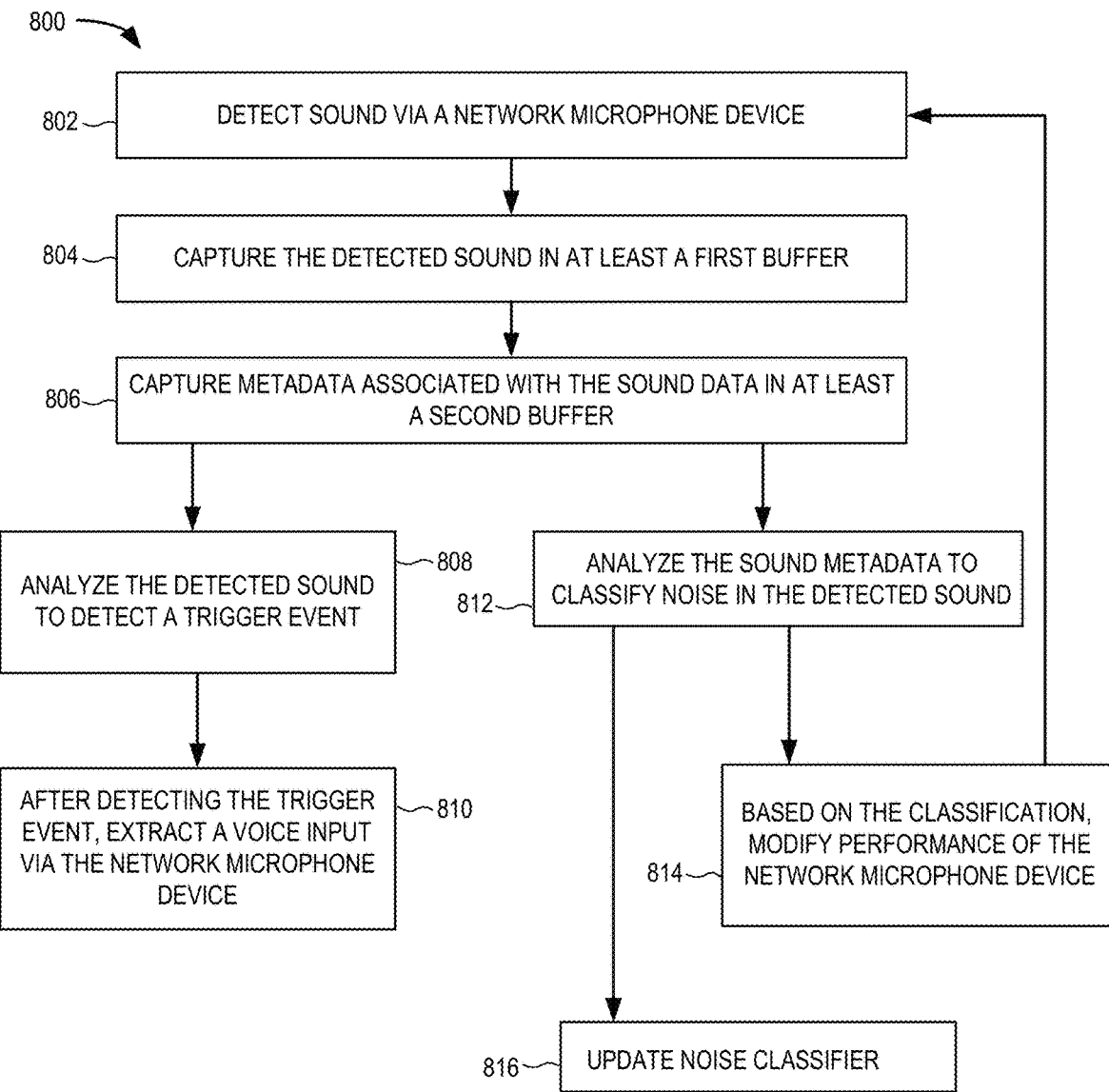
FIG. 8A illustrates an example method for classifying noise via a network microphone device in accordance with aspects of the disclosure.

FIG. 8A is an example method 800 for classifying noise and modifying performance of a network microphone device. The method 800 begins at block 802 with the NMD detecting sound via individual microphones of the NMD. Next, method 800 advances to block 804, with the NMD capturing the detected sound in at least a first buffer. For example, the captured sound can be stored as sound data SD in buffer(s) 568 (FIG. 5).

In block 806, the NMD captures metadata associated with the sound data in at least a second buffer. For example, the sound metadata can be stored in the lookback buffer 569 (FIG. 5) or in other memory associated with the NMD. As noted above, to preserve user privacy, it can be useful to rely only on sound metadata that does not reveal the original audio content (e.g., the content of recorded speech input or other detected sound data). Examples of such sound metadata include: (1) frequency response data, (2) echo return loss enhancement measures, (3) voice direction measures; (4) arbitration statistics; and/or (5) speech spectral data. Other sound metadata may also be captured and stored in the second buffer.

Next, the method 800 continues in block 808 with analyzing the detected sound to detect a trigger event. In some examples, the trigger event is the detection of a wake word. The wake word can be detected, for example, via the wake-word engine 570 (FIG. 5) as described above. In some examples, the trigger event can take other forms. For example, the trigger event can be the detection of audio signals having some specified property (e.g., detected audio volume above a predetermined threshold, detected audio signals for a predetermined length of time, etc.).

After detecting the trigger event, the method 800 continues in block 810 with extracting a voice input via the NMD. For example, a voice extractor 572 (FIG. 5) can receive and format (e.g., packetize) the stream of sound-data into messages that may be transmitted in real time or near real time to a remote VAS or other remote computing device via a network interface.

In block 812, the method 800 involves analyzing the sound metadata to classify noise in the detected sound. This analysis can be performed either locally by the NMD or remotely by one or more remote computing devices. In some examples, the analysis in block 812 can be performed concurrently with the trigger-event detection in block 808. In other examples, the analysis in block 812 only occurs after a trigger event has been detected in block 808.

Analyzing the sound metadata can include comparing one or more features of the sound metadata with known noise reference values or a sample population data with known noise. For example, any features of the sound metadata such as signal levels, frequency response spectra, etc. can be compared with noise reference values or values collected and averaged over a sample population. In some examples, analyzing the sound metadata includes projecting the frequency response spectrum onto an eigenspace corresponding to aggregated frequency response spectra from a population of NMDs (as described in more detail below with respect to FIGS. 10-13). In at least some examples, projecting the frequency response spectrum onto an eigenspace can be performed as a pre-processing step to facilitate downstream classification. In various examples, any number of different techniques for classification of noise using the sound metadata can be used, for example machine learning using decision trees, or Bayesian classifiers, neural networks, or any other classification techniques. Alternatively or additionally, various clustering techniques may be used, for example K-Means clustering, mean-shift clustering, expectation-maximization clustering, or any other suitable clustering technique.

In some examples, the noise reference samples can be obtained by capturing samples under controlled conditions (e.g., capturing audio input from a fan at different positions with respect to an NMD) or from simulations designed to mimic known noise conditions. Alternatively or additionally, the noise reference samples can be obtained from user input. For example, a user may be instructed (e.g., via the control device 104) to generate a pre-identified noise, such as turning on a kitchen sink, turning on a ceiling fan, etc., and the NMD 503 may record the proceeding audio input. By capturing audio input under different conditions as indicated by the user, known noise reference values can be obtained and stored either locally by the NMD 503 or via remote computing devices.

Figure 8B:
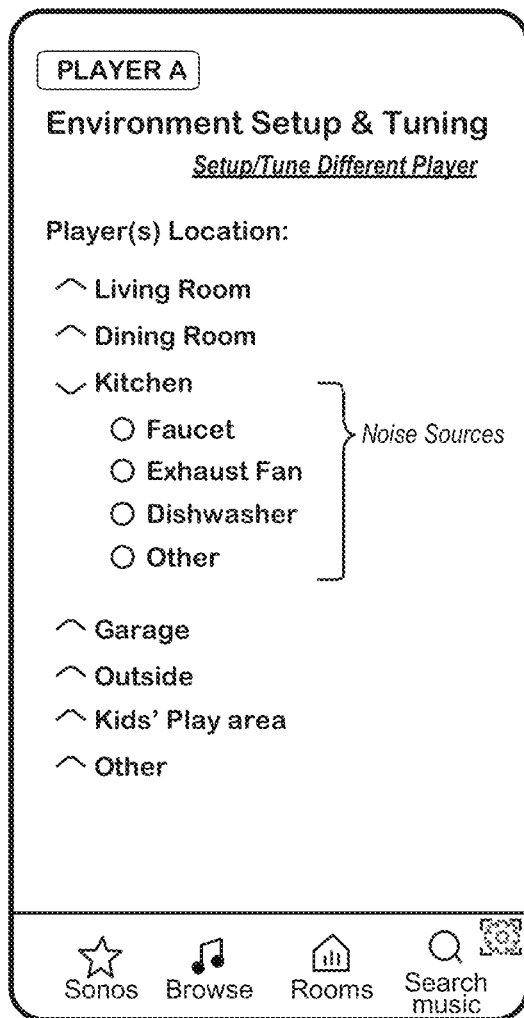
FIGS. 8B and 8C are controller interfaces in accordance with aspects of the disclosure.
Figure 8C:
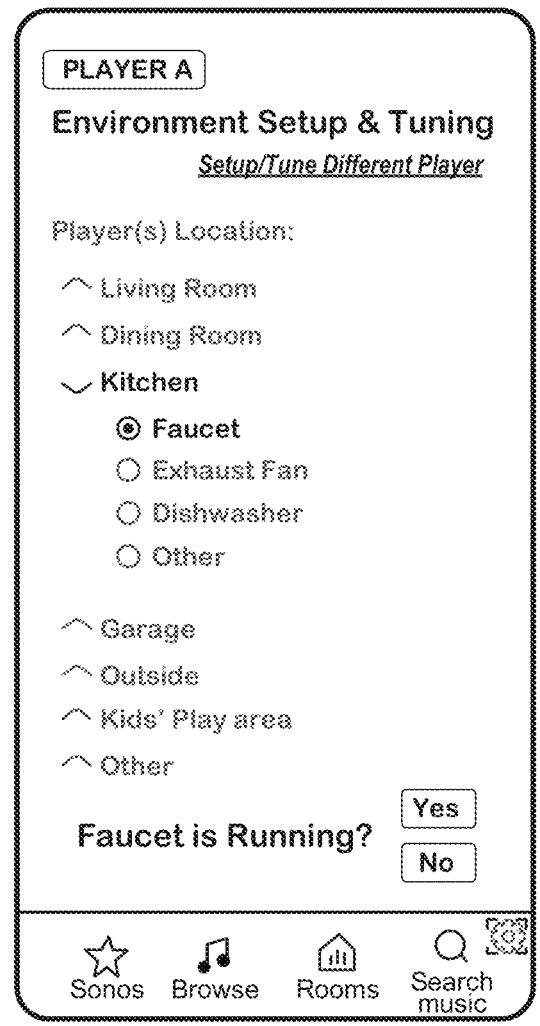

FIGS. 8B and 8C illustrate controller interfaces that can be used for receiving user input to generate pre-identified noise measurements. As shown in FIG. 8, for a particular NMD (here "Player A"), a user may select the device location from among a pre-populated list. Once a particular location is selected (e.g., "Kitchen"), various potential noise sources can be presented as user-selectable options. As seen in FIG. 8B, the example noise options associated with the Kitchen are Faucet, Exhaust Fan, Dishwasher, and Other. Similarly, other locations may have other associated noise options, for example a garage door opening or a washing machine in the Garage, etc.

In addition to user-selected noise sources, different locations may be associated with likely noise sources without requiring use selection. For example, when the user indicates that an NMD is located in the Kitchen, detected noise is more likely to include cooking sounds like sizzling grease, the sound of a refrigerator door closing, or other sounds associated with the Kitchen. Similarly, other locations can have other associated noises deemed inherent to the location, for example children's voices in the Kids' Play Area, a toilet flushing in a Bathroom, etc. By identifying the location of an NMD, the user can provide additional relevant information to be used in classifying noise detected by different devices.

In FIG. 8C, the user has selected the "Faucet" noise source via the controller interface. Following this selection, the user may be prompted to turn on the Faucet such that noise data can be collected under these controlled conditions. Once the user has indicated that the noise has been initiated (e.g., the user has turned on the faucet), the NMD may collect sound data and/or metadata. Since this data is known to be associated with faucet noise, it may be used to aid classification of noise in future audio input, whether for this particular NMD or for other devices. In various examples, the user may be prompted to repeat the designated noise (e.g., by turning on the faucet) a number of times or under different conditions. Additionally, the user may be queried regarding additional information relating to the noise source, for example, how frequently the noise source is likely to be active (e.g., "How often do you run the dishwasher?"), the make or model of a particular appliance, etc. This and other relevant information can be provided by the user via the controller interface as shown in FIGS. 8B and 8C. The collected information may then be used to improve noise classification, as capturing the audio input under these conditions can provide known noise reference to be stored either locally by the NMD or via remote computing devices.

With reference back to FIG. 8A, the method 800 continues in block 814 with modifying performance of the NMD based on the evaluation in block 812. Modification of the NMD can take a number of forms depending on the classified noise. For example, adjustment of the device can include adjusting a playback volume, adjusting a fixed gain, modifying a noise-reduction parameter, changing a wake-word-detection sensitivity parameter, or adjusting a spatial processing algorithm, etc. In various examples, the NMD can be configured to modify different performance parameters depending on the particular classified noise.

In block 816, a noise classifier can be updated based on the particular noise classification obtained in block 812. As described in more detail below, a noise classifier can include a neural network or other mathematical model configured to identify different types of noise in detected sound data or metadata. Such a noise classifier can be improved with increased available data for training and evaluation. Accordingly, noise data may be obtained from a large number of NMDs, with each new noise classification or other noise data being used to update or revise the noise classifier. Additionally, by using data collected from a large number of NMDs, the relative prevalence of individual types of noises can be assessed, which likewise can be used to update a noise classifier. In some examples, the noise classifier is not updated based on the classification obtained in block 812, for example in instances in which the metadata does not provide useful additional information for the noise classifier, or if the metadata appears to be anomalous.

Figure 9:
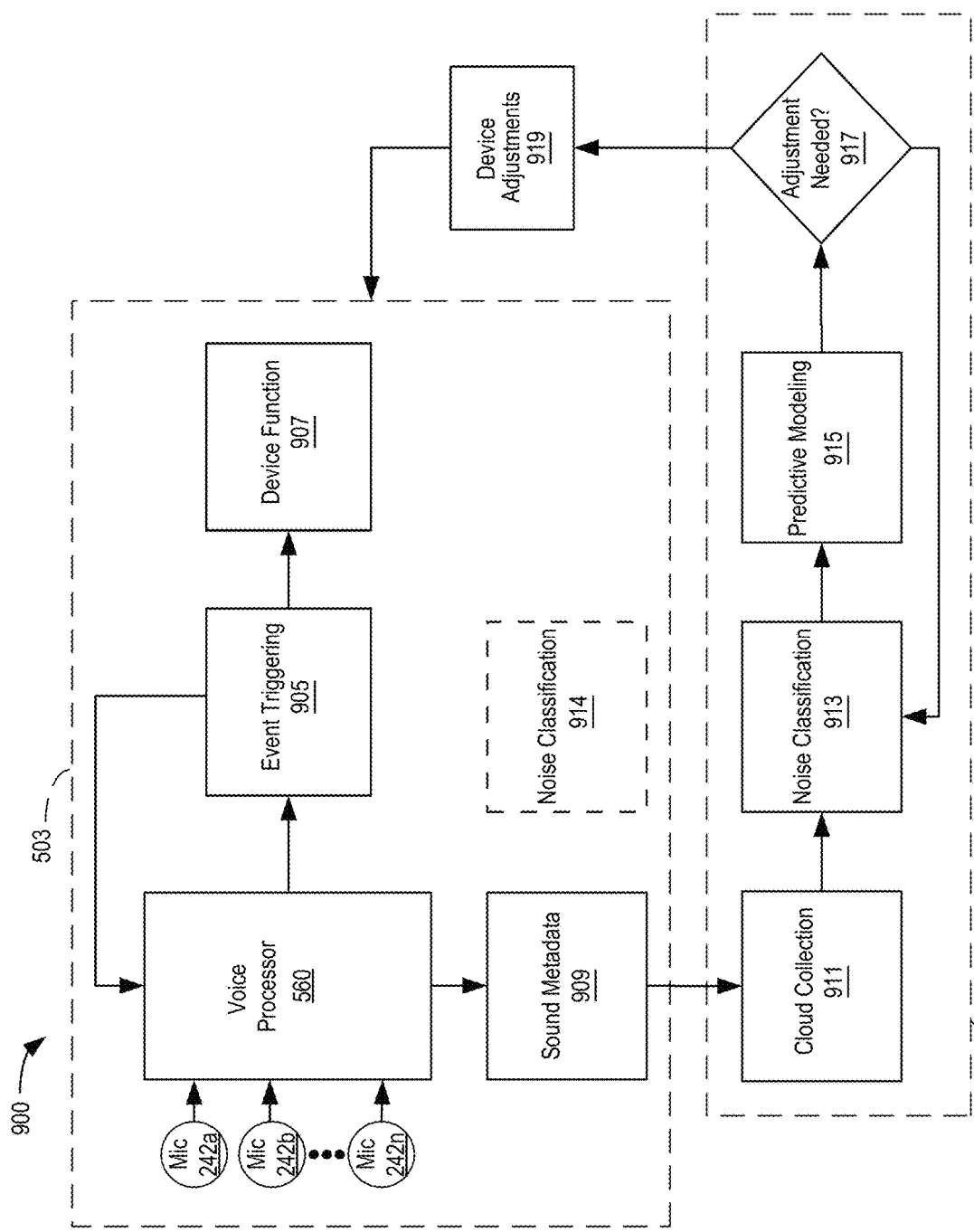
FIG. 9 is a functional flow diagram of example noise classification and network microphone device adaptation in accordance with aspects of the disclosure.

FIG. 9 is a functional flow diagram 900 of an example noise classification and microphone adaptation. The diagram 900 illustrates functions that occur on an NMD 503 as well as functions that can occur remotely, for example, on remote computing device(s) 106c, which can perform remote evaluation and processing of sound metadata for noise classification as described in more detail below. In one example, the remote computing devices 106c provide cloud servers for one or more SONOS Wireless HiFi Systems. In at least some examples, any or all of the functions depicted in flow diagram 900 can be performed on the NMD 503 rather than the remote computing device 106c.

Beginning with the NMD 503, an array of individual microphones 242a-242n detect sound and provide sound data to the voice processor 560 over multiple channels (e.g., with each microphone having a corresponding channel). As described above with respect to FIG. 5, the voice processor 560 can include one or more buffers 568 in addition to a lookback buffer 569. The voice processor 560 also includes an AEC 564 and a spatial processor 566. The microphones 242a-242n can be arranged to detect sound in the environment of the NMD 503. In one example, the microphone(s) 242a-242n may be arranged to detect audio from one or more directions relative to the NMD 503. The microphone(s) 242a-242n may further be arranged to capture location information of an audio source (e.g., voice, audible sound) and/or to assist in filtering any identified noise.

The voice processor 560 can store the sound data from the individual microphones 242a-242n in one or more buffers for a predetermined time interval. For instance, in some examples the voice processor 560 stores the sound data for less than less than 5 seconds, less than 4 seconds, less than 3 seconds, less than 2 seconds, or less than 1 second, such as overwriting in a buffer. In some implementations, the voice processor 560 includes a buffer (e.g., buffer 568) that captures sound data utilizing a sliding window approach in which a given amount (i.e., a given window) of the most recently captured detected-sound data is retained in the at least one buffer 568 while older sound data are overwritten when they fall outside of the window. For example, at least one buffer 568 may temporarily retain 20 frames of a sound specimen at given time, discard the oldest frame after an expiration time, and then capture a new frame, which is added to the 19 prior frames of the sound specimen.

The voice processor 560 can output a sound-data stream to block 905 for event triggering. Here, the NMD 503 can evaluate the sound-data stream to detect a predetermined trigger event. For example, the trigger event detected in block 905 can be detection of a wake word in the sound-data stream (e.g., using a wake-word engine 570 shown in FIG. 5). In some examples, the trigger event can take other forms. For example, the trigger event can be the detection of audio signals having some specified property (e.g., detected audio levels above a predetermined threshold, detected audio signals for a predetermined length of time, etc.). If no trigger event is detected in block 905, then the detected-sound data in the voice processor 560 can be deleted, discarded, or overwritten and the microphones 242a-242n can continue to pass newly acquired sound data to the voice processor 560 until a trigger event is detected in block 905.

If the trigger event is detected in block 905, then the sound-data stream is passed to device function in block 907. For example, in block 907, one of multiple VASes can be selected, the processed audio can be transmitted to a VAS for further processing, audible output can be provided to a user, instructions can be transmitted to an associated playback device, or any other suitable operation can be carried out following the detection of the trigger event in block 905.

Once the trigger event is detected in block 905, an indication is provided to the voice processor 560, which can in turn provide sound metadata in block 909 to a remote computing device 106c. The sound metadata can be based on the sound data from the microphones 242a-242n. As noted above, to protect user privacy, it can be useful to rely only on sound metadata that does not reveal the original audio content (e.g., the content of recorded speech input or other detected sound data). The NMD 503 can derive the sound metadata from the detected sound data a manner that renders the original sound data indecipherable if one only has access to the sound metadata. As noted above, examples of sound metadata include: (1) frequency response data, (2) an echo return loss enhancement measure (i.e., a measure of the effectiveness of the acoustic echo canceller (AEC) for each microphone), (3) a voice direction measure; (4) arbitration statistics (e.g., signal and noise estimates for the spatial processing streams associated with different microphones); and/or (5) speech spectral data (i.e., frequency response evaluated on processed audio output after acoustic echo cancellation and spatial processing have been performed). Other sound metadata may also be used to identify and/or classify noise in the detected sound data.

From block 909, the sound metadata can be transmitted from the NMD 503 to the remote computing device 106c for cloud collection in block 911. For example, the remote computing device 106c can collect sound metadata data from one or more NMDs. In some examples, the remote computing device 106c can collect sound metadata from a large population of NMDs, and such population metadata can be used to classify noise, derive averages, identify outliers, and guide modification of NMD performance parameters to improve operation of the NMD 503 in the presence of various classes of noise. Because the sound metadata is derived from the sound data but does not reveal the sound data, sending only the sound metadata to the remote computing device 106c allows for the evaluation of NMD performance without exposing the actual audio content from which the sound data is derived.

In block 913, the remote computing device 106c analyzes the sound metadata to classify the noise. In some examples, analyzing the sound metadata includes comparing one or more features of the sound metadata with noise reference values or sample population values. For example, any feature of the sound metadata (such as frequency response data, signal levels, etc.) can be compared with known noise reference values or averaged values collected from a sample population, as described in more detail below with respect to FIGS. 10-13. In some examples, the analysis of the sound metadata can be performed locally by the NMD, as shown in block 914, rather than or in addition to the evaluation performed by the remote computing device 106c.

With continued reference to FIG. 9, in block 915, the computing device 106c can perform predictive modeling to identify potential device adjustments that would improve detection and processing of voice input in the presence of different noise conditions. For example, a virtual test framework can be used to run a large number of simulations using a Monte Carlo approach, representing the expected performance of NMDs by users in the real world. A series of audio inputs having different noise components (e.g., different classifications of noise (fan, sink, traffic, etc.), different positions of noise with respect to the NMDs, etc.) can be processed by simulated NMDs having a range of different performance parameter values. The best-performing parameter values can then be identified based on the simulated results. In some examples, the best-performing parameters are determined at least in part by the rate of false-positives and false-negatives in wake-word detection. These identified performance parameters may then be used to modify performance of NMDs in the real world. This can include updating performance parameters only for NMDs that experience certain classifications of noise input (e.g., NMDs experiencing running-water noise, refrigerator noise, traffic noise, etc.).

In block 917, the remote computing device 106c determines whether the NMD performance needs to be modified based on the noise classification in block 913 and/or the predictive modeling in block 915. If no modification is needed, then the process returns to data analysis in block 913 for analysis of newly received sound metadata. If, in decision block 917, a modification is needed, then the process continues to block 919 to adjust the operation of the NMD.

With continued reference to block 919, modification of the NMD can take a number of forms depending on the identified features of the metadata. For example, adjustment of the device can include modifying a playback volume, adjusting a fixed gain, modifying a noise-reduction parameter, a wake-word-detection sensitivity parameter, or adjusting a spatial processing algorithm, etc.

FIGS. 7 and 10-12 illustrate an example approach to comparing sound metadata with known noise reference values to classify noise in audio input captured by an NMD. As noted above, in some examples sound metadata captured by an NMD can include frequency response spectra, which can be averaged over time and sampled logarithmically along the frequency range.

Data collected from a variety of NMDs can provide an overall distribution of possible frequency response spectra. Each spectrum can then be normalized by subtracting the mean of all spectral bins without converting to linear space in power. This operation translates the spectrum vertically which, since all spectra of a similar source maintain a similar shape, causes all spectra to fall into a tighter distribution. This simple operation removes the variation associated with overall volume contribution, allowing noise to be classified independent of its volume.

Figure 10:
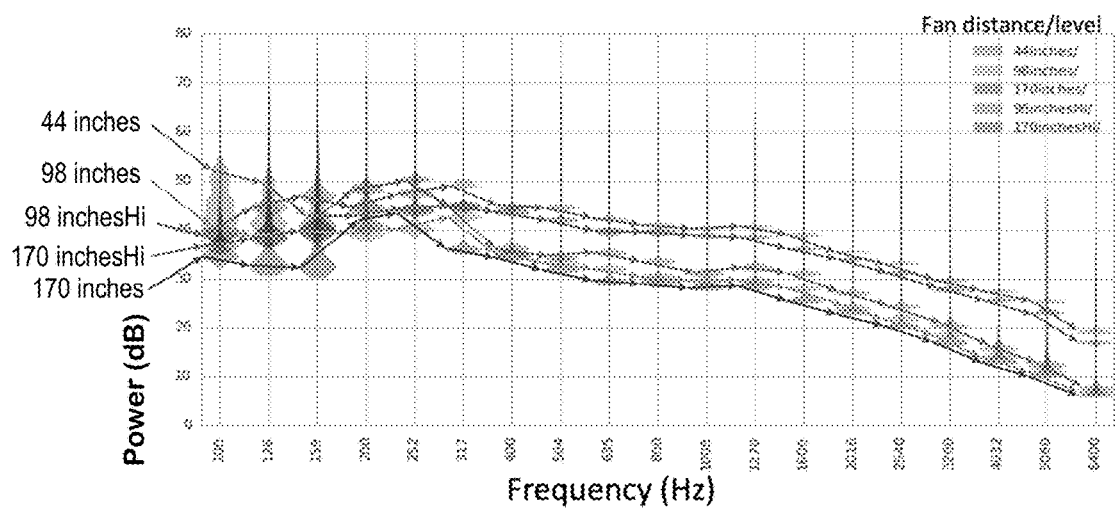
FIG. 10 is a graph of example spectra for fan noise at various distances.

FIG. 10 illustrates some example spectra that show the vertical translation of similar spectral shapes for noises measured from fans at varying fan speeds and varying distances from the NMD. Each group shows the distribution of measurements for a particular configuration. This behavior is consistent with the behavior of well understood noise types such as white noise or pink noise where the overall spectral shape of the noise is defined by the slope of the spectrum, not the absolute level. To generate the overall distribution of possible frequency response data, many such spectra can be collected via NMDs in user's homes or under controlled conditions.

Figure 11:
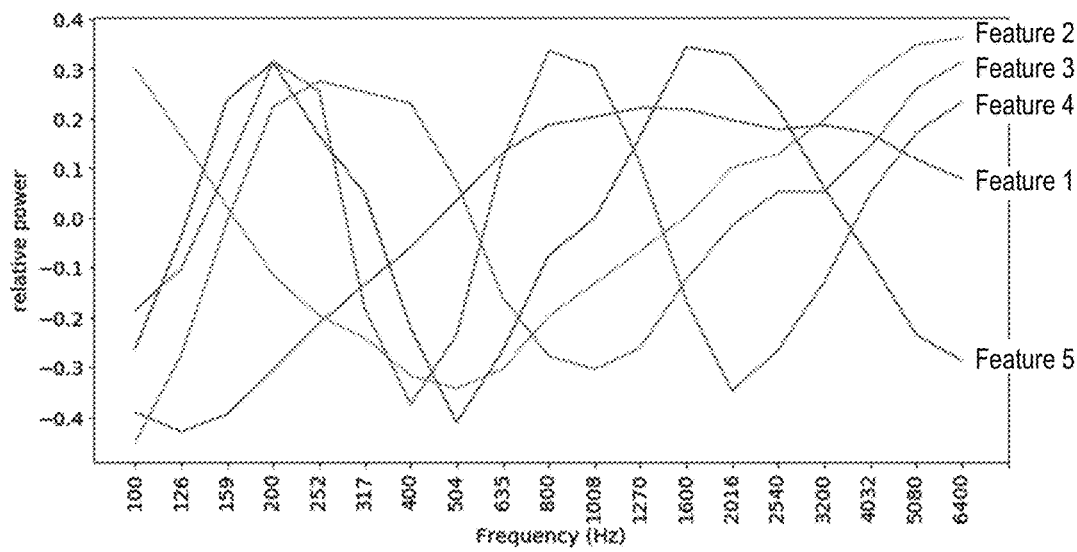
FIG. 11 is an example graph of basis vectors derived from principal component analysis of microphone spectral data.

The spectral data obtained from a large number of NMDs contains a large variety of possible noise types that are not known explicitly for each measurement. However, this large number of measurements can be used to define an orthogonal basis (eigenspace) using principal component analysis (PCA), which identifies the axes of highest variance. For example, using approximately 10 million measurements of spectral data collected from a number of NMDs in the field, microphone spectra can be averaged per spectral bin and then normalized as described above. PCA may then be used to define the orthogonal basis. FIG. 11 illustrates an example of some basis vectors that define an eigenspace. Although five basis vectors are illustrated, in various examples the number of basis vectors may vary, for example two, three, or four basis vectors, or alternatively, six, seven, eight, or more basis vectors.

This operation produces the set of matrices:

$$X = USV^T$$

Where X is the original vector space containing all of the field spectra. U is a unitary matrix, S is a diagonal matrix of singular values, and $V^T$ is the matrix of eigenvectors that define the axes of highest variance.

Figure 12:
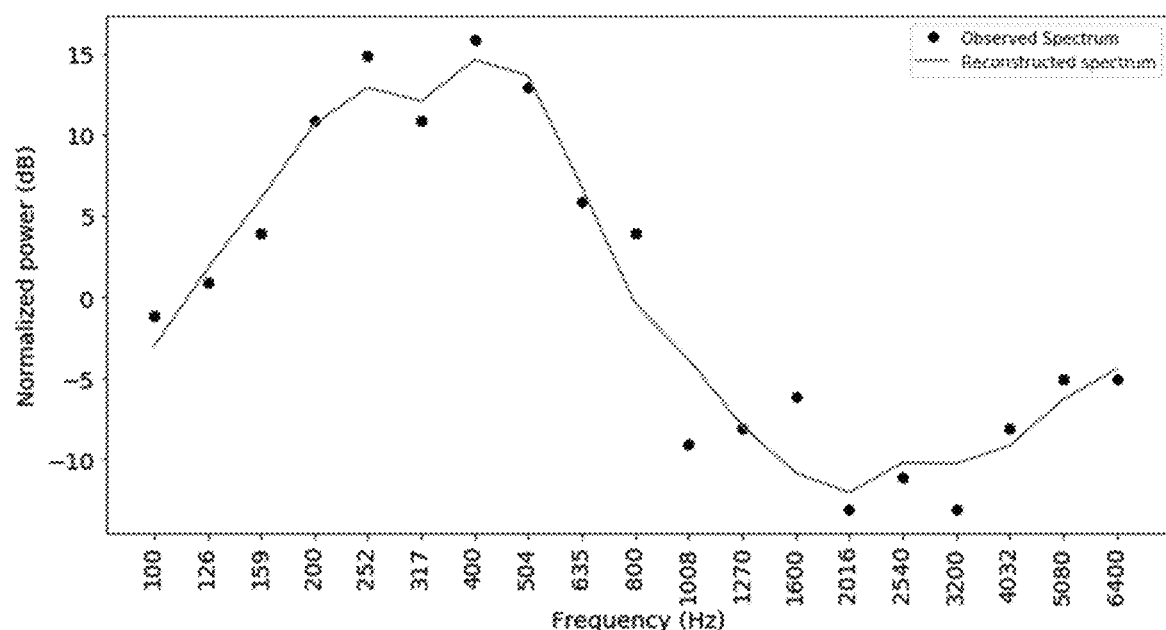
FIG. 12 is an example graph of a reconstructed spectrum for classifying noise data.

Using these eigenvectors (e.g., the basis vectors illustrated in FIG. 11), any newly observed spectrum N can be projected onto the new space by performing a dot product between the new spectrum and this basis, N'=NV. This calculation defines the eigenvalues for each spectrum which can be reconstructed as a linear combination of any subset of these eigenvectors and eigenvalues. FIG. 12 illustrates one of these spectra reconstructed with the subset of eigenvectors that describe the most variance in the population distribution. As shown in FIG. 12, the observed spectrum provides a plurality of discrete frequency response values. The reconstructed spectrum represents a combination of the basis vectors (e.g., the basis vectors shown in FIG. 11), with the strength of each basis vector being varied to best fit the observed spectrum. As shown, the reconstructed spectrum substantially corresponds to the observed spectrum. In operation, any newly received frequency response spectrum can be reconstructed using a linear combination of basis vectors (e.g., the basis vectors shown in FIG. 11).

Figure 13:
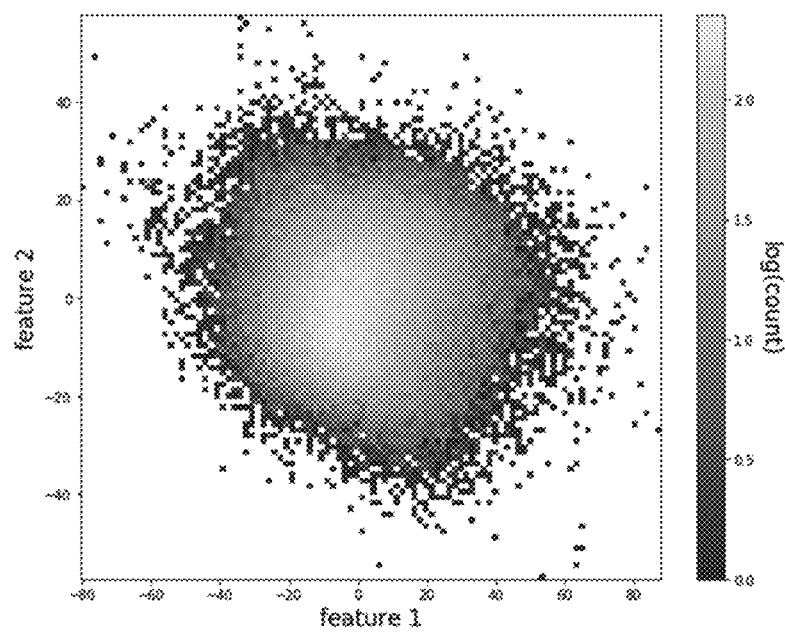
FIG. 13 is a graph of an example distribution of spectra captured from a large population of network microphone devices.
Figure 14:
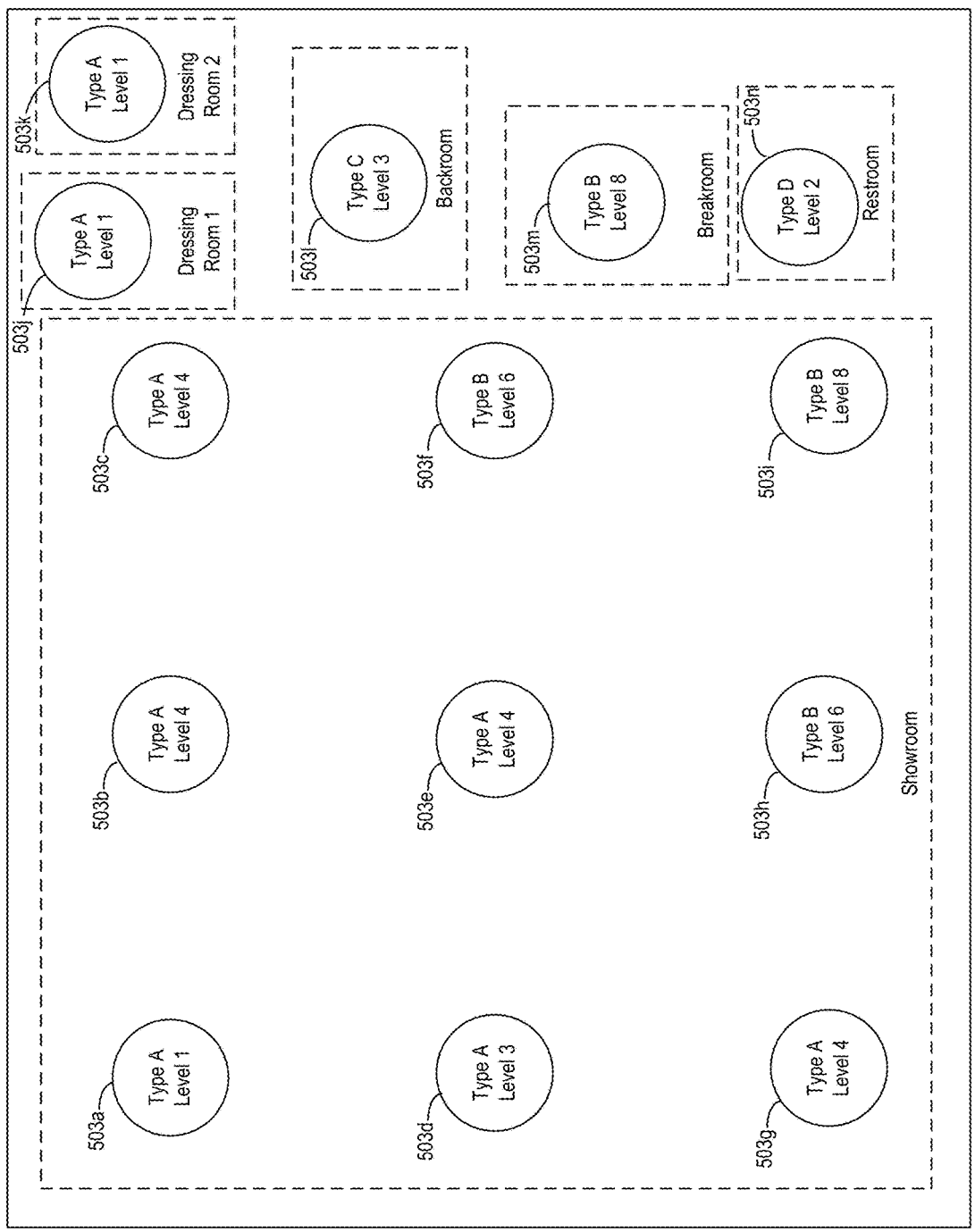
FIG. 14 is a schematic diagram of a plurality of playback devices configured to characterize and map acoustic events within an environment in accordance with aspects of the disclosure.

It may be impractical to classify every possible noise that might be encountered by an NMD in the field. However, the distribution of noises in the subsets of the above eigenspectra can be visualized. FIG. 13 illustrates the overall distribution of observed field spectra as strengths of the first two eigenvectors (e.g., the two of the basis vectors as shown in FIG. 11 that are most responsible for the observed variance). With respect to FIG. 13, "feature 1" is the strength of a first eigenvector in the reconstructed spectrum (e.g., the reconstructed spectrum shown in FIG. 12), and "feature 2" is the strength of a second eigenvector in the reconstructed spectrum (e.g., the reconstructed spectrum shown in FIG. 12). Although the plot in FIG. 13 illustrates values for two features (e.g., the strengths of two basis vectors in the reconstructed spectrum), the values for additional features may be used to classify noise. For example, there may be three, four, five, or more features, each corresponding to a strength of a different basis vector in the reconstructed spectrum. By evaluating a newly observed spectrum in terms of additional features, different noise types may be more readily distinguished from one another, thereby improving overall noise classification.

The separation between noise cases in the field is continuous with individual clusters of noises, and therefore may not be easily discernable. This is due to the small variation in every type of noise, which causes difficulty in identifying specific noise regions because each region is less distinct. The distribution of noises may be further illuminated using simulation software, taking a known set of recorded noises and generating spectra in a similar manner as in the field, but in a controlled and highly repeatable fashion. These known test sample spectra can then be projected onto the eigenspace as "test particles" that trace their presence in the distribution of field noises. In the plots of FIG. 7, the field density distributions are shown by the contour lines, and the individual points are test samples run through the simulation, showing different placement of the parameter space. As seen in FIG. 7, the different noise sources produce different clusters of points projected onto the eigenspace.

With this understanding of the data collected from a large number of NMDs, the relative prevalence of individual types of noises can be identified. Further, a classifier can be constructed using a neural network to identify noises in collected data from one or more NMDs. For example, the neural network can be trained on a set of known, labeled noises that are projected onto the population's eigenspace. These known, labeled noises can be processed by simulation software and can include many types of typical noises grouped into a handful of labels for classification such as "ambient," "fan," "sink," "interfering speech," etc., each of which may provide sufficient insight to tune performance parameters of an NMD, for example by modifying a noise cancellation algorithm or other audio processing algorithms.

In some examples, the classifier may be used to further understand the relative contributions of noise experienced by a particular device. For example, if a particular device experiences higher than average levels of fan noise, particular performance parameters of that NMD may be modified to accommodate the heightened fan noise, while another NMD that experiences higher than expected levels of traffic noise may be adjusted differently.

Although the above example utilizes principal component analysis to aid classification of different types of noise, various other techniques and algorithms may be used in the classification process. For example, machine learning using decision trees, or Bayesian classifiers, neural networks, or any other classification techniques may be employed. Alternatively or additionally, various clustering techniques may be used, for example K-Means clustering, mean-shift clustering, expectation-maximization clustering, or any other suitable clustering technique.

IV. Characterizing and Mapping Noise and Other Acoustic Events Within an Environment As noted previously, a plurality of NMDs can be distributed within an environment, such as a user's home, or a commercial space such as a restaurant, retail store, mall, hotel, etc. In some examples, a plurality of NMDs are installed within a commercial environment, such as being mounted to walls and ceilings, integrated into light fixtures, or otherwise embedded at a plurality of locations within the environment. By detecting and analyzing the detected sounds, the NMDs can characterize acoustic events such as noise within the environment. Furthermore, if the positions of the NMDs within the environment and/or relative to one another are known, a spatial map of the detected noise and other acoustic events can be constructed.

Figure 15:
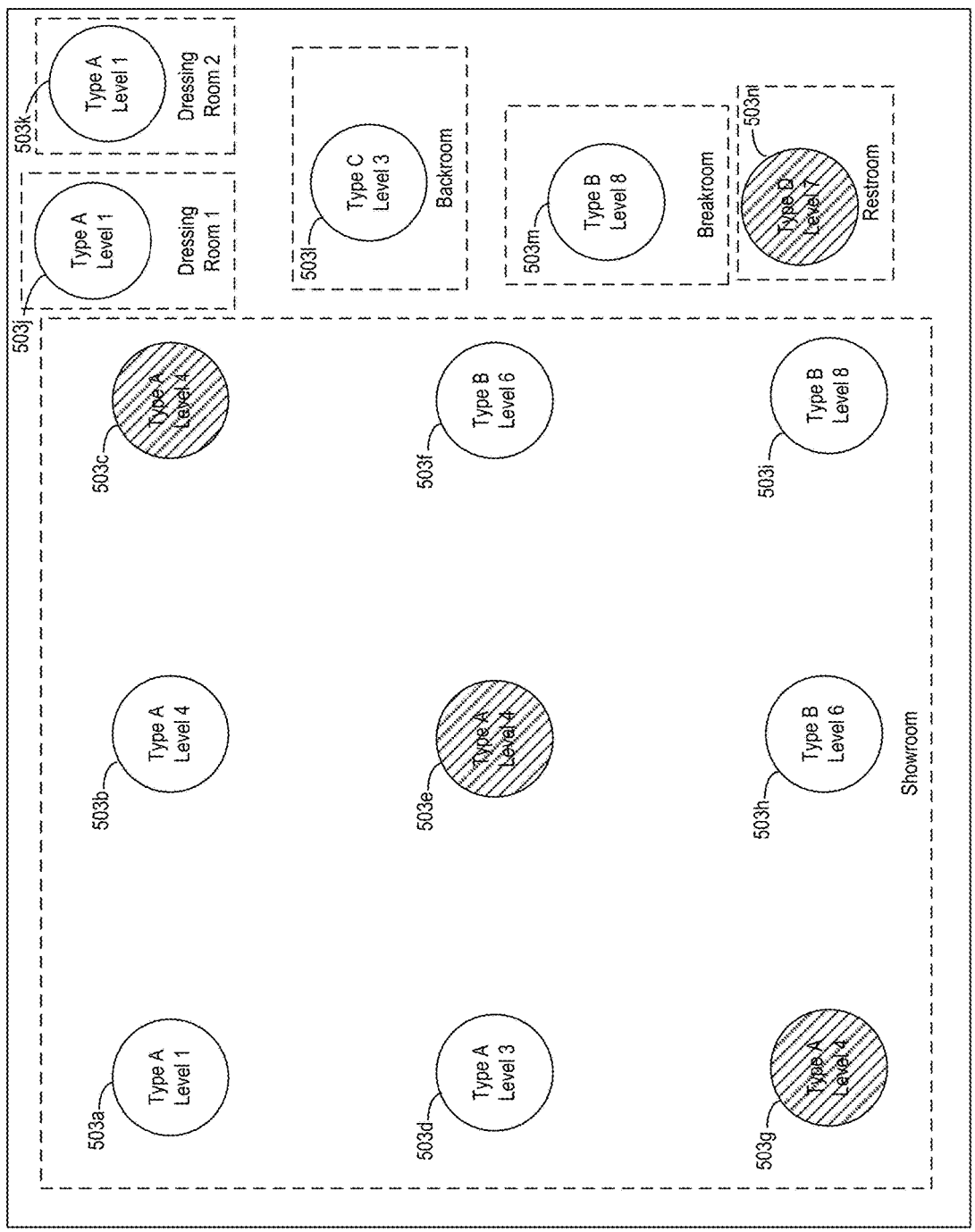
FIG. 15 is a schematic diagram of a plurality of playback devices configured to mask or suppress noise within an environment in accordance with aspects of the disclosure.

FIG. 15 is a schematic diagram of a plurality of NMDs 503a-n (collectively "NMDs 503") distributed within an environment such as a retail store. In this example, the NMDs 503 may each be mounted overhead or otherwise positioned at the illustrated locations within the environment. Additionally, the environment can include different rooms or regions, including a main Showroom, a Dressing Room 1, Dressing Room 2, Backroom, Breakroom, and Restroom. This environment is shown for purposes of illustration only; the present technology can be applied to any suitable environment, whether commercial, residential, or otherwise.

In operation, some or all of the NMDs 503 can be configured to both output audio (e.g., via one or more onboard audio transducers) and to detect sound (e.g., via one or more onboard microphones). In various examples, the microphones can be configured to detect sound continuously, periodically according to a predetermined schedule, intermittently in response to trigger events, or according to any other desired configuration. In processing the detected sound, the NMDs 503 may utilize acoustic echo cancellation and other techniques to eliminate the detection of self-sound resulting from the output audio and from the audio output by other NMDs within the environment.

In some examples, the detected sound can be converted to frequency-domain information before being further processed, as described elsewhere herein, which may facilitate user privacy as user speech would not be decipherable in the frequency-domain information. Alternatively, the detected sound may be stored in the time domain, or may take any other suitable form for downstream processing. Particularly in the case of public retail environment, users within the environment may have a lower expectation of privacy, thereby reducing the need to obfuscate the detected sound.

In some aspects, the relative positions of the NMDs 503 with respect to the environment and/or with respect to one another can be obtained or determined. For example, a user may manually indicate the relative positions of the NMDs within the environment, for example via an interface of a controller device. Additionally or alternatively, the NMDs may communicate with one another to detect their relative positions. Such communication can include any suitable technique, such as transmitting and receiving localization signals between various devices. The localization signals can include, for example, sound waves (e.g., audible or ultrasonic localization), optical signals (e.g., laser time-of-flight detection or other distance determinations), or other electromagnetic signals (e.g., ultrawideband antennas, use of received signal strength indicator (RSSI) data via WiFi antennas, etc.). Additional details of determining relative positions of devices within an environment can be found in Appendix A.

Each of the NMDs 503 may detect sound in the environment and capture respective sound specimens. These sound specimens can then be analyzed to detect and/or classify noise or other acoustic events within the environment. In the illustrated example, of the NMDs 503 indicates a particular type of noise (e.g., Type A=traffic, Type B=background speech, Type C=a humming refrigerator, and Type D=running water). Although the illustrated example shows a single noise type at each device, in various examples the NMDs may detect multiple different types of noise, each with its own associated level. Additionally, other acoustic events beyond noise can be detected, such as user speech, a door opening or closing, an alarm, a user walking across a room, etc. By comparing and combining the determinations of each of the respective NMDs 503, a spatial map of the noise (or speech or other acoustic events) within the environment can be constructed.

The spatial map can depend at least in part on the relative locations of the playback devices with respect to one another and/or with respect to the environment. As noted previously, these locations can be determined via the NMDs themselves and/or via a user input. The spatial map can assign the respective noise determinations to the particular positions of the NMDs 503 within the environment. Moreover, in some examples, the spatial map can interpolate or extend the noise determinations at those NMDs to characterize the noise or other acoustic events at the regions beyond and between the playback devices. For example, NMD 503a detects level 1 of Type A noise (e.g., traffic noise) and NMD 503b detects level 4 of Type A noise. The space between two NMDs can be represented as having Type A noise that decreases from NMDs 503a towards the NMD 503b. This approach can be extended to multiple playback devices and across multiple dimensions to generate a spatial map that reflects and/or estimates noise or other acoustic events at various positions within the environment.

In some examples, a visual representation of the spatial map can be presented to a user via a user interface (e.g., a controller device such as a smartphone or tablet). In some examples, a heat map or other such graphical representation can be overlaid over a view of the environment that reflects the particular noise or other acoustic events. The representation need not be a graphical view of the environment, but can take any suitable form. In at least some examples, this step may be omitted, and no visual representation of the spatial map need be displayed to the user. Such a visual representation of the spatial map can be useful in a variety of circumstances. For example, a manager may identify persistent noise levels at one region of the environment (e.g., high traffic noise at NMDs 503b and 503c), indicating the need for interventions such as acoustic panels or white noise to reduce the perceived noise for users within the environment. In the case of a restaurant, a maître d' can consult such as visual representation of a spatial map in determining where to seat guests within a restaurant.

In some examples, the one or more of the NMDs can modify an audio output based on the acoustic determinations (e.g., detection of noise, speech, etc.) within the environment. For example, if NMD 503i detects type B noise (e.g., background speech) at level 8, this indicates a high noise level and, in response, the surrounding NMDs 503f and 503i may modify their audio output in a manner that masks or suppresses the detected background speech for adjacent areas in the space. Additionally or alternatively, if high speech levels are detected, the acoustic output can be modified so as to enhance speech for the listeners, such as by lowering the volume level of audio within speech frequencies.

In some examples, such modification of the audio output can be responsive to user input (e.g., via a controller device). In various instances, modifying the audio output can include one or more of adjusting a volume level (e.g., for the full-frequency output or only over select frequency ranges), adjusting an equalization parameter, switching audio content, layering on additional audio content (e.g., adding filtered white noise configured to mask the particular noise detected), or any other suitable modification of the audio output.

FIG. 15 is a schematic diagram of a plurality of playback devices configured to mask or suppress noise within an environment in accordance with aspects of the disclosure. In the illustrated example, NMDs 503g, 503e, 503c, and 503n each have modified their respective audio output in a manner that masks or suppresses the detected noise. For example, each of these select NMDs 503 may output audio of a particular frequency band that corresponds to the frequency band of the detected noise. Alternatively, the NMDs 503 may output audio that is configured to destructively interfere with the detected noise within the environment. This can be particularly applicable when the noise is a relatively steady-state audio, such as a humming refrigerator or other similar environmental noise. In still other examples, the particular NMDs 503 may modify the volume, equalization parameters, can adjust or switch the select audio output, or make any other suitable modification to the audio output that results in masking or suppressing the detected noise within the environment. In some examples, the modified audio output can itself vary in real-time or near real-time based on continued noise determinations. For example, as the detected noise determinations vary (e.g., the detected noise level decreases), the modified audio output may also be varied (e.g., the added audio over a particular frequency band can be reduced or can cease altogether).

Figure 16:
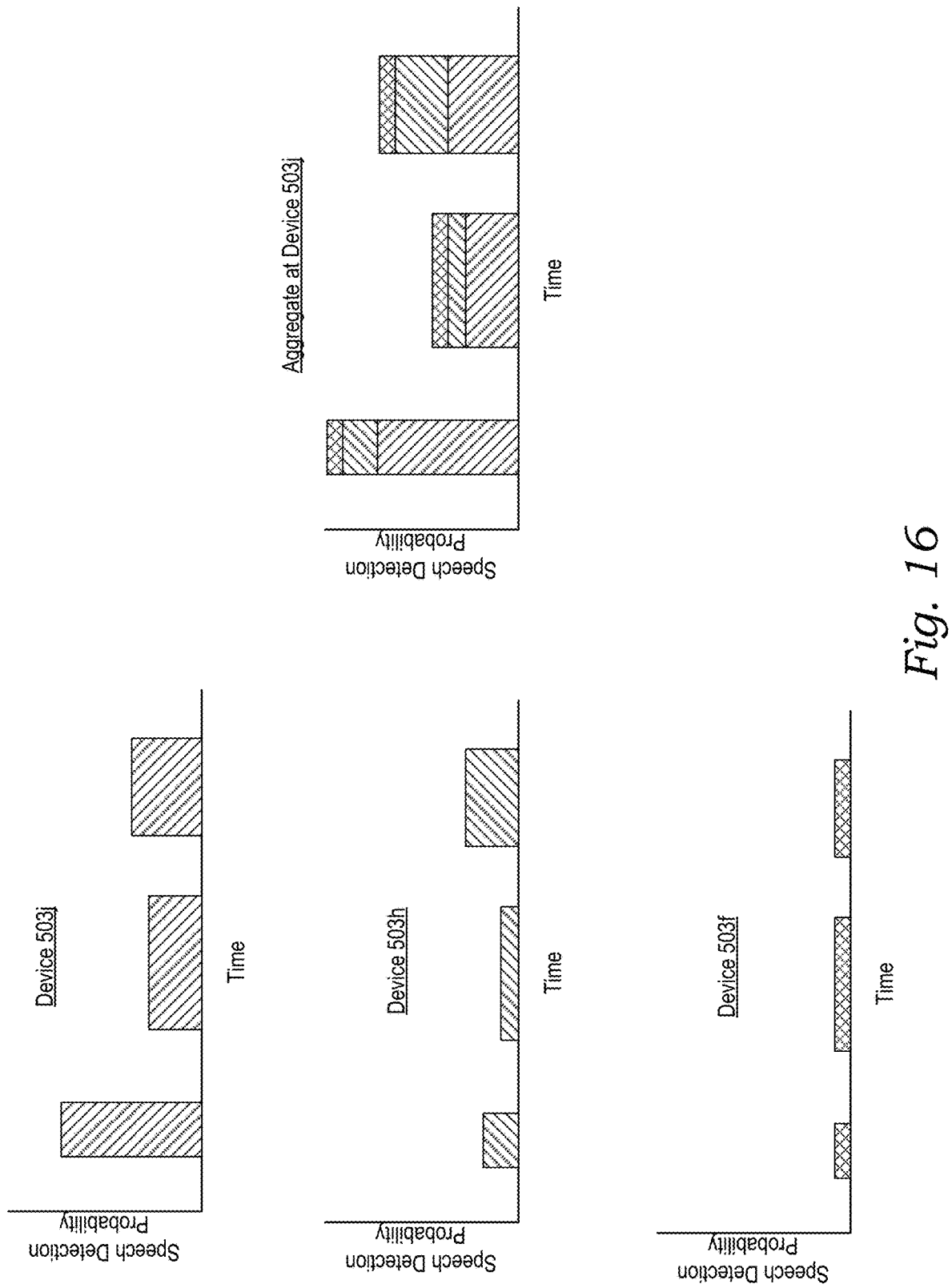
FIG. 16 illustrates graphs of speech detection probabilities at various devices within the environment shown in FIGS. 15 and 16 in accordance with aspects of the disclosure.

FIG. 16 illustrates graphs of speech detection probabilities at various devices within the environment shown in FIGS. 15 and 16 in accordance with aspects of the disclosure. As illustrated, speech detection probabilities can be calculated at various NMDs 503j, 503h and 503f. In some instances, these speech detection probabilities can be added together or otherwise used in combination to reflect an aggregated speech detection probability at the NMD 503j. This approach can therefore leverage the analysis of adjacent NMDs to reinforce or augment the acoustic analysis of any particular NMD within the environment. The resulting determinations may therefore have increased confidence and precision as compared to determinations from a single NMD.

Although this example illustrates speech detection probabilities, this approach can be extended to any type of acoustic event determination, noise classification, or other such analysis. For example, the results of analysis of detected sound from multiple devices can be evaluated together or otherwise combined to determine whether a particular detected noise falls into one category (e.g., background speech) or another (e.g., fan noise). Moreover, in some examples the determinations made via multiple different devices can be combined to improve acoustic localization (e.g., determining that an acoustic source is at a particular location within the environment). Various other techniques for combining outputs of the various NMDs can be used, and the combined outputs can be usefully applied for a variety of purposes.

Figure 17:
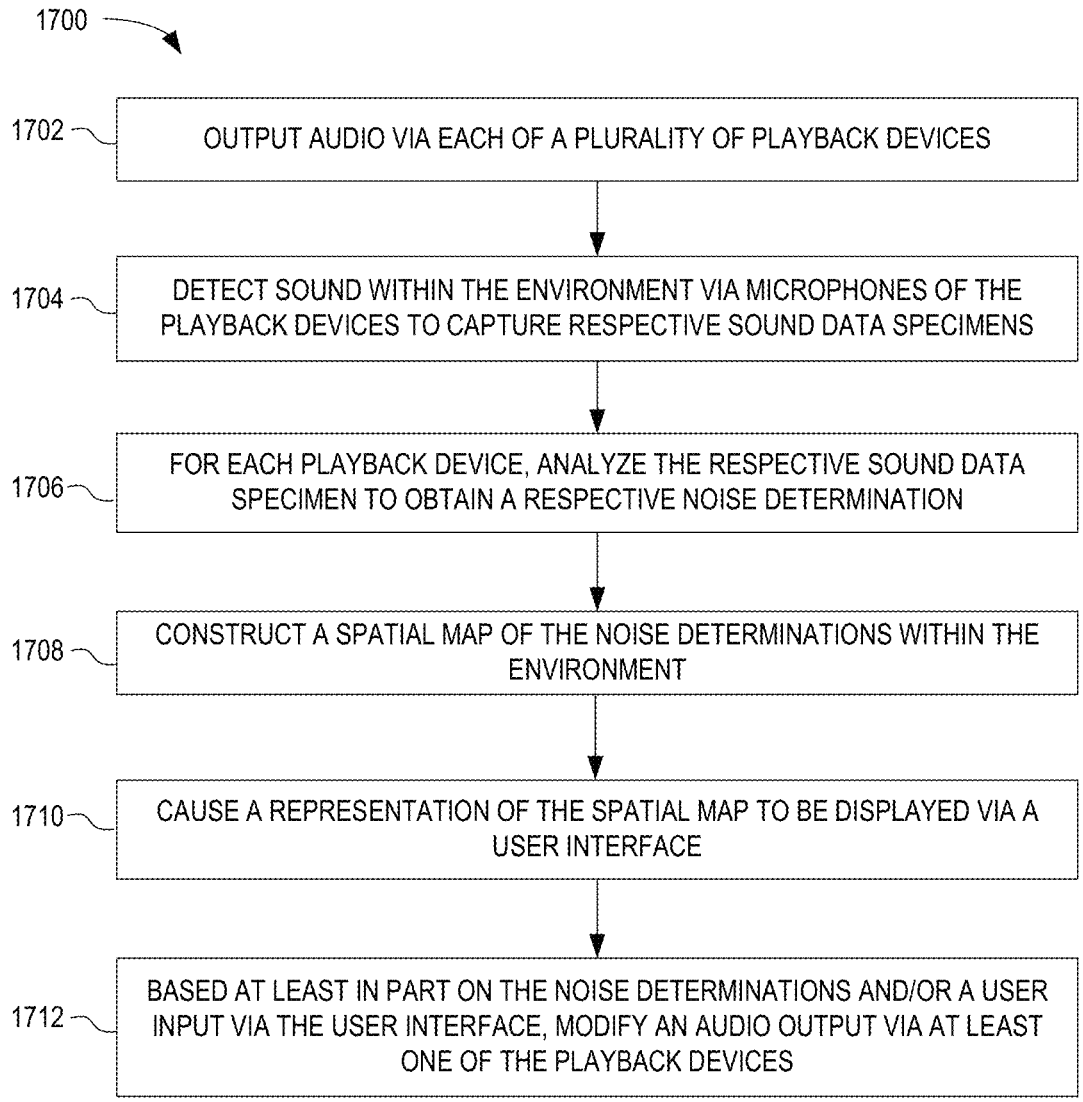
FIG. 17 illustrates an example method for characterizing and mapping acoustic events within an environment in accordance with aspects of the disclosure.

FIG. 17 illustrates an example method 1700 for characterizing and mapping noise or other acoustic events within an environment. The process 1700 can be implemented by any of the playback devices or NMDs disclosed and/or described herein, or any other playback device or NMD now known or later developed. Various examples of process 1700 include one or more operations, functions, and actions. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

The process 1700 begins in block 1702 with outputting audio via a plurality of playback devices within an environment. For example, a plurality of playback devices can be mounted overhead within a retail space or restaurant, or they may be distributed about a user's home. The audio played back can be synchronous playback of the same media content (optionally with various playback devices having different playback responsibilities). Alternatively, the audio played back can differ among the various playback devices. For example, a first subset of playback devices may output ambient music, while a second subset of playback devices may output a news show.

In block 1704, the playback devices, each of which includes at least one microphone, can each detect sound within the environment to capture respective sound data specimens. In various examples, the microphones can be configured to detect sound continuously, periodically according to a predetermined schedule, intermittently in response to trigger events, or according to any other desired configuration. In some examples, the detected sound can be converted to frequency-domain information before being further processed, as described elsewhere herein, which may facilitate user privacy as user speech would not be decipherable in the frequency-domain information. Alternatively, the detected sound may remain in the time domain, or may take any other suitable form for downstream processing.

In block 1706, the process 1700 involves analyzing the respect sound data specimen for each playback device to obtain a respective noise determination. These noise determinations can include, for example, relative noise levels, classification of noise into discrete types (e.g., background speech, ambient noise, water running, fan noise, a dishwasher, etc.). In addition to noise determinations, the sound data specimens can be analyzed to detect and/or localize other acoustic events, including speech detection, conversation density estimations, acoustic source localization, etc.

The method 1700 continues in block 1708 with constructing a spatial map of the noise determinations within the environment. The spatial map can depend at least in part on the relative locations of the playback devices with respect to one another and/or with respect to the environment. Such locations can be obtained via a user input or may be determined via the playback devices themselves, such as by using localization signals transmitted and/or received by the various devices within the environment. As mentioned previously, the localization signals can take any suitable form, including sound waves, optical signals (e.g., lasers), non-visible electromagnetic signals (e.g., ultrawideband, Wi-Fi RSSI, etc.), etc. The spatial map can assign the respective noise determinations to the particular positions of the playback devices within the environment. Moreover, in some examples, the spatial map can interpolate or extend the noise determinations at those devices to characterize the noise or other acoustic events at the regions between playback devices. For example, if a high level of background speech noise is detected at a first playback device, and a significantly lower level is detected at an adjacent second playback device, the region between the devices can be assigned a background speech noise level that decreases from the first playback device to the second playback device. This principle can be extended to multiple playback devices and across multiple dimensions to generate a spatial map that reflects and/or estimates noise or other acoustic events at various positions within the environment.

In block 1710, the method 1700 includes causing a representation of the spatial map to be displayed via a user interface. For example, an overhead plan view similar to those illustrated in FIGS. 14 and 15 can be presented via a display, optionally with the ability for the user to select one or more playback devices and to modify audio output via the interface. In some examples, a heat map or other such graphical representation can be overlaid over a view of the environment that reflects the particular noise or other acoustic events. The representation need not be a graphical view of the environment, but can take any suitable form. In at least some examples, this step may be omitted, and no visual representation of the spatial map need be displayed to the user. In such instances, the system may construct the spatial map for its internal functionality (e.g., to modify audio output to mask noise or to detect events within the environment) without presenting a visual representation of such a spatial map to a user.

Finally, in block 1712, an audio output via at least one of the playback devices is modified based at least in part on the noise determinations and/or a user input via the user interface. For example, the output audio can be modified in a manner that masks or suppresses noise within the environment. Such modification can include, for example, adjusting a volume level, adjusting an equalization parameter, switching audio content, or layering on additional audio content (e.g., adding filtered white noise configured to mask the particular noise detected). In some examples, only a subset of the playback devices modify their audio output, while in other instances all of the playback devices may modify the audio output in response to the noise determinations and/or the user input. The particular modification may be uniform across affected playback devices, or may vary from one device to the next depending on the particular configuration and arrangement of the devices and the particular characteristics of the noise.

In some instances, the modification of audio input can be responsive to user input via a user interface. For example, a visual representation of a spatial map presented to a user may permit a user to select certain regions or playback devices within the environment and to instruct a modification of audio output (e.g., to mask noise in the selected regions). In some instances, a suggested modification can be automatically presented to the user for confirmation. If the user confirms (e.g., via selecting an appropriate button or other input via a controller device), then the playback devices can modify their audio output accordingly.

As discussed previously, detection and characterization of noise and other acoustic events within an environment can be used for a variety of purposes not explicitly discussed herein. In particular, constructing a spatial map of such noise and other acoustic events may be useful in a wide range of circumstances, including tailoring audio output to achieve a desired psychoacoustic effect, for detecting user presence or location within an environment, for estimating the number of people present within various regions of the environment, and numerous other instances.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

In addition to the examples described herein with respect to stationary playback devices, aspects of the present technology can be applied to headphones, earbuds, or other in- or over-ear playback devices. For example, such in- or over-ear playback devices can include noise-cancellation functionality to reduce the user's perception of outside noise during playback. In some examples, noise classification can be used to modulate noise cancellation under certain conditions. For example, if a user is listening to music with noise-cancelling headphones, the noise cancellation feature may be temporarily disabled or down-regulated when a user's doorbell rings. Alternatively or additionally, the playback volume may be adjusted based on detection of the doorbell chime. By detecting the sound of the doorbell (e.g., by correctly classifying the doorbell based on received sound metadata), the noise cancellation functionality can be modified so that the user is able to hear the doorbell even while wearing noise-cancelling headphones. Various other approaches can be used to modulate performance parameters of headphones or other such devices based on the noise classification techniques described herein.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain aspects of the present disclosure can be practiced without certain, specific details. In other instances, well known methods, procedures, components, and circuitry have not been described in detail to avoid unnecessarily obscuring aspects of the examples and aspects of the present technology. Accordingly, the scope of the present disclosure is defined by the appended claims rather than the forgoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

VI. Examples

The present technology is illustrated, for example, according to various aspects described below. Various examples of aspects of the present technology are described as numbered examples for convenience. These are provided as examples and do not limit the present technology. It is noted that any of the dependent examples may be combined in any combination, and placed into a respective independent example. The other examples can be presented in a similar manner.

Example 1. A media playback system comprising: a plurality of playback devices distributed about an environment, each of the playback devices including at least one microphone and at least one audio transducer; one or more processors communicatively coupled to the plurality of playback devices; and data storage having instructions stored thereon that, when executed by the one or more processors, cause the system to perform operations comprising: outputting audio via each of the audio transducers; detecting sound within the environment via each of the microphones, wherein each of the at least one microphones captures a respective sound data specimen; for each of the playback devices, analyzing the respective sound data specimen to obtain a respective noise determination; constructing a spatial map of the noise determinations within the environment; causing a representation of the spatial map to be displayed via a user interface; and based at least in part on the noise determinations and/or a user input via the user interface, modifying an audio output via at least one of the playback devices.

Example 2. The system of any one of the Examples herein, wherein analyzing the respective sound data specimen to obtain the respective noise determinations comprises obtaining a voice detection probability for each respective sound data specimen.

Example 3. The system of any one of the Examples herein, wherein analyzing the respective sound data specimen to obtain the respective noise determinations comprises classifying noise in each respective sound data specimen into discrete noise types (e.g., with assigned probabilities).

Example 4. The system of any one of the Examples herein, wherein analyzing the respective sound data specimen to obtain the respective noise determinations comprises identifying relative noise levels among the respective sound data specimens.

Example 5. The system of any one of the Examples herein, wherein modifying the audio output comprises outputting masking audio configured to mask detected noise at one or more locations within the environment.

Example 6. The system of any one of the Examples herein, wherein modifying the audio output comprises one or more of: adjusting a volume level, adjusting an equalization parameter, or switching audio content.

Example 7. The system of any one of the Examples herein, wherein constructing the spatial map comprises indicating a spatial distribution of the playback devices within the environment, and wherein the spatial distribution is based at least in part on localization signals transmitted between two or more of the playback devices.

Example 8. A method, comprising: outputting audio via a plurality of playback devices within an environment, each of the playback devices comprising at least one microphone and at least one audio transducer; detecting sound within the environment via each of the microphones, wherein each of the at least one microphones captures a respective sound data specimen; for each of the playback devices, analyzing the respective sound data specimen to obtain a respective noise determination; constructing a spatial map of the noise determinations within the environment; causing a representation of the spatial map to be displayed via a user interface; and based at least in part on the noise determinations and/or a user input via the user interface, modifying an audio output via at least one of the playback devices.

Example 9. The method of any one of the Examples herein, wherein analyzing the respective sound data specimen to obtain the respective noise determinations comprises obtaining a voice detection probability for each respective sound data specimen.

Example 10. The method of any one of the Examples herein, wherein analyzing the respective sound data specimen to obtain the respective noise determinations comprises classifying noise in each respective sound data specimen into discrete noise types.

Example 11. The method of any one of the Examples herein, wherein analyzing the respective sound data specimen to obtain the respective noise determinations comprises identifying relative noise levels among the respective sound data specimens.

Example 12. The method of any one of the Examples herein, wherein modifying the audio output comprises outputting masking audio configured to mask detected noise at one or more locations within the environment.

Example 13. The method of any one of the Examples herein, wherein modifying the audio output comprises one or more of: adjusting a volume level, adjusting an equalization parameter, or switching audio content.

Example 14. The method of any one of the Examples herein, wherein constructing the spatial map comprises indicating a spatial distribution of the playback devices within the environment, and wherein the spatial distribution is based at least in part on localization signals transmitted between two or more of the playback devices.

Example 15. One or more tangible, non-transitory, computer-readable media storing instructions that, when executed by one or more processors of a media playback system comprising a plurality of playback devices, cause the media playback system to perform operations comprising: outputting audio via the plurality of playback devices within an environment, each of the playback devices comprising at least one microphone and at least one audio transducer; detecting sound within the environment via each of the microphones, wherein each of the at least one microphones captures a respective sound data specimen; for each of the playback devices, analyzing the respective sound data specimen to obtain a respective noise determination; constructing a spatial map of the noise determinations within the environment; causing a representation of the spatial map to be displayed via a user interface; and based at least in part on the noise determinations and/or a user input via the user interface, modifying an audio output via at least one of the playback devices.

Example 16. The one or more computer-readable media of any one of the Examples herein, wherein analyzing the respective sound data specimen to obtain the respective noise determinations comprises obtaining a voice detection probability for each respective sound data specimen.

Example 17. The one or more computer-readable media of any one of the Examples herein, wherein analyzing the respective sound data specimen to obtain the respective noise determinations comprises classifying noise in each respective sound data specimen into discrete noise types.

Example 18. The one or more computer-readable media of any one of the Examples herein, wherein analyzing the respective sound data specimen to obtain the respective noise determinations comprises identifying relative noise levels among the respective sound data specimens.

Example 19. The one or more computer-readable media of any one of the Examples herein, wherein modifying the audio output comprises outputting masking audio configured to mask detected noise at one or more locations within the environment.

Example 20. The one or more computer-readable media of any one of the Examples herein, wherein constructing the spatial map comprises indicating a spatial distribution of the playback devices within the environment, and wherein the spatial distribution is based at least in part on localization signals transmitted between two or more of the playback devices.

The invention claimed is:

1. A media playback system comprising:
a plurality of playback devices distributed about an environment, each of the playback devices including at least one microphone and at least one audio transducer;
one or more processors communicatively coupled to the plurality of playback devices; and
data storage having instructions stored thereon that, when executed by the one or more processors, cause the system to perform operations comprising:
outputting audio via each of the audio transducers;
detecting sound within the environment via each of the microphones, wherein each of the at least one microphones captures a respective sound data specimen;
for each of the playback devices, analyzing the respective sound data specimen to obtain a respective noise determination;
constructing a spatial map of the noise determinations within the environment;
causing a representation of the spatial map to be displayed via a user interface, the spatial map indicating a spatial distribution of the playback devices within the environment and the associated noise determinations;
receiving, via the user interface, a user input identifying one or more regions of spatial map for audio modification;
based at least in part on a user input via the user interface, modifying an audio output via only a subset of the playback devices;
after modifying the audio output, detecting additional sound within the environment via each of the microphones to capture updated respective sound data specimens;
for each of the playback devices, analyzing the updated respective sound data specimen to obtain an updated respective noise determination;
updating the spatial map; and
causing a representation of the updated spatial map to be displayed via the user interface.

2. The system of claim 1, wherein analyzing the respective sound data specimen to obtain the respective noise determinations comprises obtaining a voice detection probability for each respective sound data specimen.

3. The system of claim 1, wherein analyzing the respective sound data specimen to obtain the respective noise determinations comprises classifying noise in each respective sound data specimen into discrete noise types.

4. The system of claim 1, wherein analyzing the respective sound data specimen to obtain the respective noise determinations comprises identifying relative noise levels among the respective sound data specimens.

5. The system of claim 1, wherein modifying the audio output comprises outputting masking audio configured to mask detected noise at one or more locations within the environment.

6. The system of claim 1, wherein modifying the audio output comprises one or more of: adjusting a volume level, adjusting dynamic range control parameters, adjusting an equalization parameter, or switching audio content.

7. The system of claim 1, wherein constructing the spatial map comprises indicating a spatial distribution of the playback devices within the environment, and wherein the spatial distribution is based at least in part on localization signals transmitted between two or more of the playback devices.

8. A method, comprising:
outputting audio via a plurality of playback devices within an environment, each of the playback devices comprising at least one microphone and at least one audio transducer;
detecting sound within the environment via each of the microphones, wherein each of the at least one microphones captures a respective sound data specimen;
for each of the playback devices, analyzing the respective sound data specimen to obtain a respective noise determination;
constructing a spatial map of the noise determinations within the environment;
causing a representation of the spatial map to be displayed via a user interface, the spatial map indicating spatial distribution of the playback devices within the environment and the associated noise determinations;
receiving, via the user interface, a user input identifying one or more regions of spatial map for audio modification;
based at least in part on the user input via the user interface, modifying an audio output via only a subset of the playback devices;
after modifying the audio output, detecting additional sound within the environment via each of the microphones to capture updated respective sound data specimens;
for each of the playback devices, analyzing the updated respective sound data specimen to obtain an updated respective noise determination;
updating the spatial map; and
causing a representation of the updated spatial map to be displayed via the user interface.

9. The method of claim 8, wherein analyzing the respective sound data specimen to obtain the respective noise determinations comprises obtaining a voice detection probability for each respective sound data specimen.

10. The method of claim 8, wherein analyzing the respective sound data specimen to obtain the respective noise determinations comprises classifying noise in each respective sound data specimen into discrete noise types.

11. The method of claim 8, wherein analyzing the respective sound data specimen to obtain the respective noise determinations comprises identifying relative noise levels among the respective sound data specimens.

12. The method of claim 8, wherein modifying the audio output comprises outputting masking audio configured to mask detected noise at one or more locations within the environment.

13. The method of claim 8, wherein modifying the audio output comprises one or more of: adjusting a volume level, adjusting dynamic range control parameters, adjusting an equalization parameter, or switching audio content.

14. The method of claim 8, wherein constructing the spatial map comprises indicating a spatial distribution of the playback devices within the environment, and wherein the spatial distribution is based at least in part on localization signals transmitted between two or more of the playback devices.

15. One or more tangible, non-transitory, computer-readable media storing instructions that, when executed by one or more processors of a media playback system comprising a plurality of playback devices, cause the media playback system to perform operations comprising:
   outputting audio via the plurality of playback devices within an environment, each of the playback devices comprising at least one microphone and at least one audio transducer;
   detecting sound within the environment via each of the microphones, wherein each of the at least one microphones captures a respective sound data specimen;
   for each of the playback devices, analyzing the respective sound data specimen to obtain a respective noise determination;
   constructing a spatial map of the noise determinations within the environment;
   causing a representation of the spatial map to be displayed via a user interface, the spatial map indicating a spacial distribution of the playback devices within the environment and the associated noise determinations;
   receiving, via the user interface, a user input identifying one or more regions of spatial map for audio modification;
   based at least in part on the user input via the user interface, modifying an audio output via only a subset of the playback devices;
   after modifying the audio output, detecting additional sound within the environment via each of the microphones to capture updated respective sound data specimens;
   for each of the playback devices, analyzing the updated respective sound data specimen to obtain an updated respective noise determination;
   updating the spatial map; and
   causing a representation of the updated spatial map to be displayed via the user interface.

16. The one or more computer-readable media of claim 15, wherein analyzing the respective sound data specimen to obtain the respective noise determinations comprises obtaining a voice detection probability for each respective sound data specimen.

17. The one or more computer-readable media of claim 15, wherein analyzing the respective sound data specimen to obtain the respective noise determinations comprises classifying noise in each respective sound data specimen into discrete noise types.

18. The one or more computer-readable media of claim 15, wherein analyzing the respective sound data specimen to obtain the respective noise determinations comprises identifying relative noise levels among the respective sound data specimens.

19. The one or more computer-readable media of claim 15, wherein modifying the audio output comprises outputting masking audio configured to mask detected noise at one or more locations within the environment.

20. The one or more computer-readable media of claim 15, wherein constructing the spatial map comprises indicating a spatial distribution of the playback devices within the environment, and wherein the spatial distribution is based at least in part on localization signals transmitted between two or more of the playback devices.

* * * * *

UNITED STATES PATENT AND TRADEMARK OFFICE
CERTIFICATE OF CORRECTION

PATENT NO. : 12,342,141 B2
APPLICATION NO. : 17/936668
DATED : June 24, 2025
INVENTOR(S) : Mehrabi et al.

Page 1 of 1

It is certified that error appears in the above-identified patent and that said Letters Patent is hereby corrected as shown below:

In the Claims

In Column 41, in Claim 15, Line 41, delete "spacial" and insert -- spatial --, therefor.

Signed and Sealed this
Twenty-ninth Day of July, 2025

Coke Morgan Stewart
*Acting Director of the United States Patent and Trademark Office*